United States Patent [19]  
Sakata

[11] Patent Number: 4,926,177  
[45] Date of Patent: May 15, 1990

[54] OPTICAL ANALOG-DIGITAL CONVERTER PROVIDED WITH A NONLINEAR OPTICAL ELEMENT AND AN OPTICAL FEEDBACK SYSTEM FOR THE OUTPUT LIGHTS OF SAID ELEMENT

[75] Inventor: Hajime Sakata, Hiratsuka, Japan

[73] Assignee: Canon Kabushiki Kaisha, Tokyo, Japan

[21] Appl. No.: 195,950

[22] Filed: May 19, 1988

[30] Foreign Application Priority Data

| May 21, 1987 | [JP] | Japan | 62-124379 |
| May 21, 1987 | [JP] | Japan | 62-124380 |
| Oct. 5, 1987 | [JP] | Japan | 62-251076 |
| Oct. 5, 1987 | [JP] | Japan | 62-251077 |
| Apr. 23, 1988 | [JP] | Japan | 63-101026 |

[51] Int. Cl.⁵ ............................................. H03M 1/12  
[52] U.S. Cl. ...................................... 341/137; 341/155  
[58] Field of Search ........................... 341/137, 155, 13

[56] References Cited

U.S. PATENT DOCUMENTS

| 4,045,792 | 8/1977 | Schaefer et al. | 341/137 |
| 4,058,722 | 11/1977 | Taylor | 341/137 X |
| 4,502,037 | 2/1985 | Le Parquier et al. | 341/137 |
| 4,542,367 | 9/1985 | Shreve | 341/137 |
| 4,712,089 | 12/1987 | Verber | 341/137 |
| 4,851,840 | 7/1989 | McAulay | 341/137 |

Primary Examiner—William M. Shoop, Jr.  
Assistant Examiner—Marc S. Hoff  
Attorney, Agent, or Firm—Fitzpatrick, Cella, Harper & Scinto

[57] ABSTRACT

An optical analog-digital converter comprises a nonlinear optical element having a threshold value for the intensity of an input light and producing a first and a second output light from the input light with the threshold value as a reference. The optical element produces a first output light of intensity corresponding to a digital signal meaning the digital 0 and a second output light of intensity proportional to the input light intensity when the intensity of the input light is smaller than the threshold value, and produces a first output light of an intensity corresponding to a digital signal meaning the digit 1 and a second output light of intensity equal to the input light intensity minus the threshold value when the intensity of the input light is greater than the threshold value. A device inputs to the nonlinear optical element a light having an intensity distribution corresponding to an analog signal, an optical feedback system causes the second output light of the nonlinear optical element produced from the input light to be again input to the nonlinear optical element, and a device provided in the feedback system amplifiers the second output light.

64 Claims, 29 Drawing Sheets

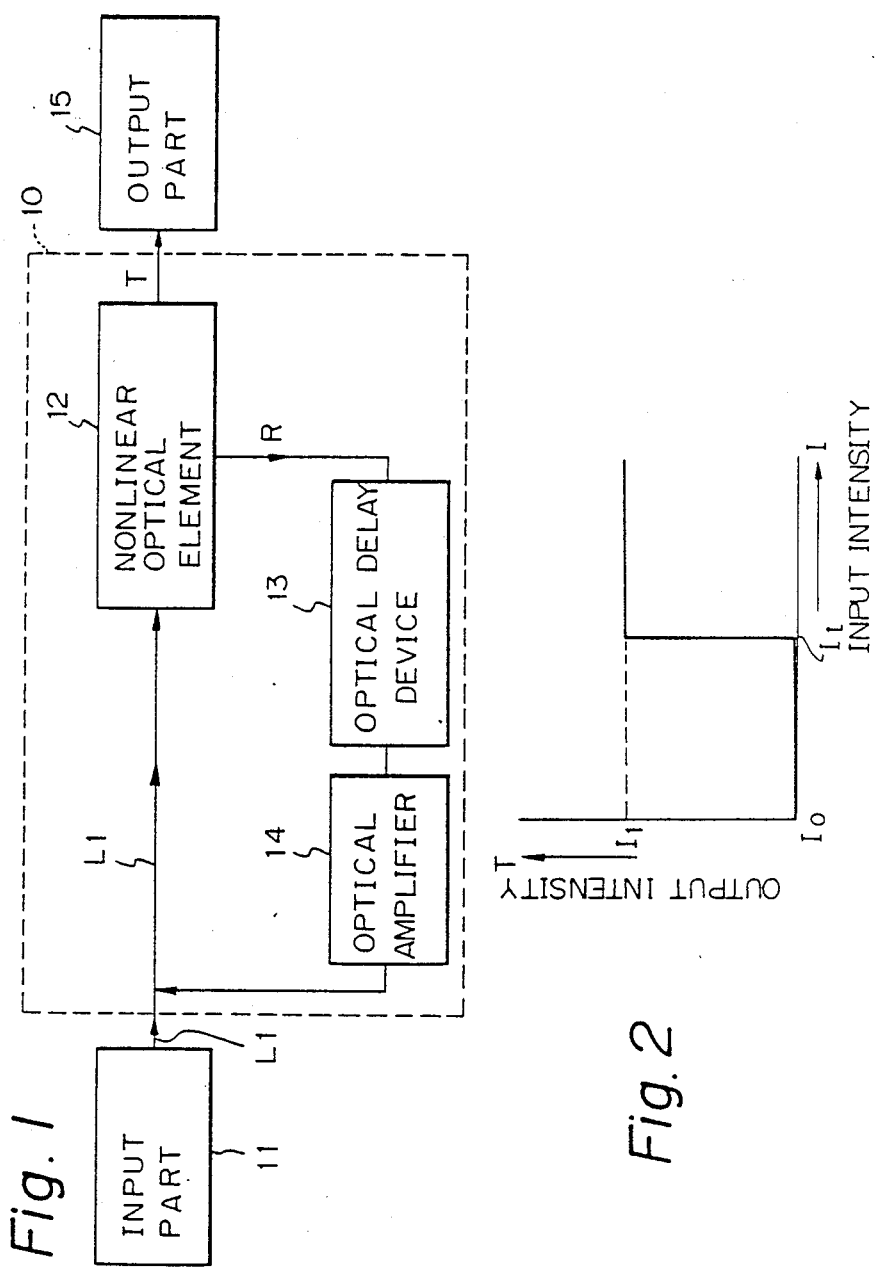

Fig. 33
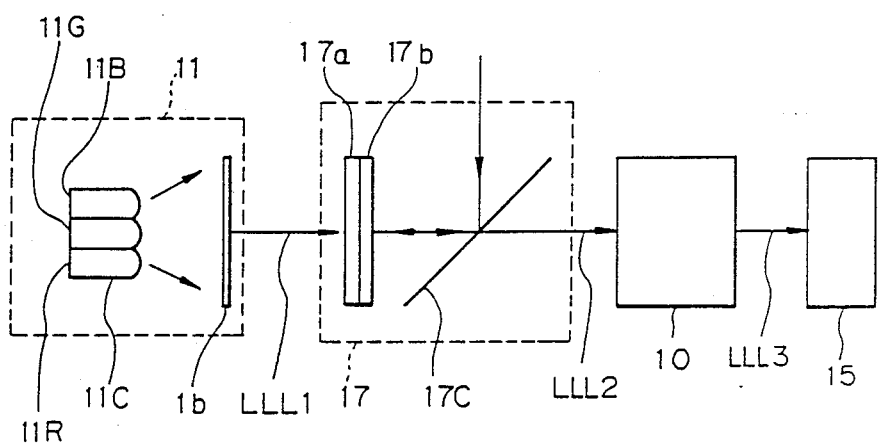
Fig. 34
Fig. 35
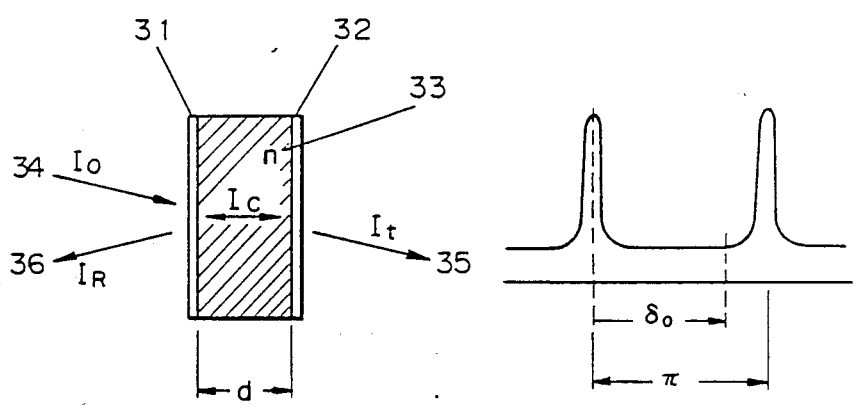

OPTICAL ANALOG-DIGITAL CONVERTER PROVIDED WITH A NONLINEAR OPTICAL ELEMENT AND AN OPTICAL FEEDBACK SYSTEM FOR THE OUTPUT LIGHTS OF SAID ELEMENT

BACKGROUND OF THE INVENTION

1. Field of the Invention

This invention relates to an optical analog-digital (hereinafter abbreviated as A-D) converter, and in particular to a highly accurate optical A-D converter capable of accomplishing optical parallel processing utilizing two kinds of output lights output from a nonlinear optical element.

2. Related Background Art

In recent years, in the field of image processing and the field of image communications, it has been practised to use a so-called A-D converter for converting analog image information regarding an image into optical or electrical digital information and digitally process the digital information obtained from the A-D converter by a computer with high accuracy and at a high speed.

Particularly, the field of image processing has been remarkably developed and is looking for a demand for diverse A-D converters of high speed and high accuracy.

Generally, in the image processing, an attempt to achieve higher accuracy leads to an increase in the number of picture elements of an image. On the other hand, recently, the amount of information in an image has increased. Accordingly, it is required that the processing time per picture element be made higher than before.

For example, mentioning a specific example of the numerical value, the processing speed of the A-D converter for 10 bits is now about 0.1 $\mu$sec. in the case of a considerably high speed converter.

If the number of picture elements to be processed is, e.g. 100×100, a processing time of about 1 msec. is required for the entire image. Also, if the number of picture elements to be processed is 1000×1000, the processing time required will be considerably long, say, about 100 msec.

Therefore, recently, attempts to achieve a higher speed by utilizing optical processing instead of electrical processing have been proposed, for example, in Japanese Laid-Open Patent Applications Nos. 54-11756 and 56-153921. In these publications, electrical analog information is replaced with an optical signal and at the same time, quantization is effected by optical processing using a density filter or the acousto-optical effect and binarization is effected as an electrical signal in conformity with the quantization levels.

In these publications, however, the optical signal is used only at the stage of quantization and therefore, photoelectric conversion elements, code generating circuits, etc. corresponding in number to the number of quantization levels are required at the stage of binarization. Thus, if the number of quantization levels is increased in conformity with the number of bits to be processed, the construction becomes correspondingly complex, and also, the optical processing is used only in a portion, and this has led to difficulty in achieving an overall high speed.

Also, a method of effecting A-D conversion without the use of electrical chips is proposed, for example, in U.S. Pat. No. 4,565,924. In this patent, however, an optical analog quantity is simply distinguished in two stages and the method of this patent is limited in its use.

As noted above, in the image processing according to the prior art, it has been very difficult to achieve a high speed by optically effecting A-D conversion.

On the other hand, so-called nonlinear optical elements emitting an output light having a nonlinear characteristic relative to the intensity of an input light are discussed in "All-optical computation—a parallel integrator based upon a single gate full adder", B. S. Wherrett, *Optics Communications*, Vol. 56, No. 2, pp. 87–92, Nov. 15, 1985, "Optical bistability, photonic logic, and optical computation", S. D. Smith, *Applied Optics*, Vol. 25, No. 10, pp. 1550–1564, May 15, 1986, and "Application of bistable optical logic gate arrays to all-optical digital parallel processing", A. C. Walker, *Applied Optics*, Vol. 25, No. 10, pp 1578–1585, May 15, 1986.

SUMMARY OF THE INVENTION

It is the object of the present invention to solve the above-noted problems peculiar to the prior art and to provide an optical A-D converter using a nonlinear optical element which is capable of accomplishing two-dimensional parallel processing at a high speed and with high accuracy.

The object of the present invention is achieved by an optical A-D converter comprising a nonlinear optical element having a threshold value for the intensity of an input light and producing a first and a second output light from said input light with said threshold value as a reference, said element producing a first output light of intensity corresponding to a digital signal meaning the digit 0 and a second output light of intensity proportional to the input light intensity when the intensity of said input light is smaller than said threshold value, and producing a first output light of intensity corresponding to a digital signal meaning the digit 1 and a second output light of intensity equal to the input light intensity minus the threshold value, means for inputting to said nonlinear optical element a light having an intensity distribution corresponding to an analog signal, an optical feedback system for causing the second output light of said nonlinear optical element produced from said input light to be again input to said nonlinear optical element, and means provided in said feedback system for amplifying said second output light.

In the present invention, means for controlling the threshold value of the nonlinear optical element may be used instead of said amplifying means. Also, a nonlinear Fabry-Pérot resonator is suitably used as the nonlinear optical element. It is desirable that the nonlinear Fabry-Pérot resonator satisfy the following conditions:

$$R_B e^{-2\alpha d} - 0.15 \leq R_F \leq R_B e^{-2\alpha d} + 0.15,$$

where $R_F$ and $R_B$ are the reflectances of the mirrors on the incidence side and the transmission side, respectively, $\alpha$ is the absorption rate in the resonator, and d is the resonator length.

The optical A-D converter of the present invention is suitably used in fields such as image processing and image communications.

BRIEF DESCRIPTION OF THE DRAWINGS

FIG. 1 is a block diagram showing an embodiment of the optical A-D converter of the present invention.

FIGS. 2 and 3 are graphs showing the input and output characteristics of a nonlinear optical element used in the present invention.

FIGS. 34-42 illustrate the optimization of a nonlinear Fabry-Pérot resonator used in the present invention.

DESCRIPTION OF THE PREFERRED EMBODIMENTS

Figure 3:
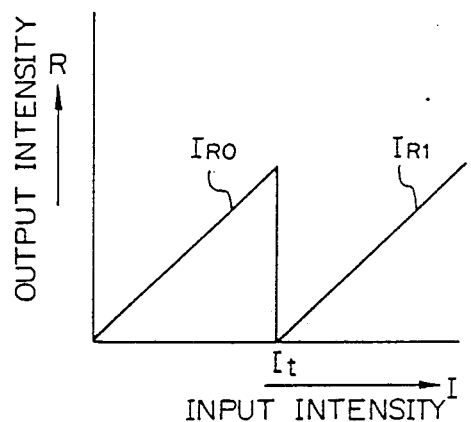

Referring to FIG. 1 which is a block diagram of an embodiment of the optical A-D converter of the present invention, the reference numeral 10 designates optical A-D converter means having a nonlinear optical element 12, an optical delay device 13 and an optical amplifier 14. The reference numeral 11 denotes an input part which inputs an input light L1 comprising an analog amount such as image information for optical A-D conversion to the nonlinear optical element 12 of the optical A-D converter means 10. The nonlinear optical element 12 has a predetermined threshold value for the input light L1 and outputs two kinds of output lights, i.e., a first output light T comprising a digital signal and a second output light R comprising an analog signal, at a time with said threshold value as the reference.

The optical delay device 13 delays the second output light R input from the nonlinear optical element 12 by a predetermined time and outputs it. The optical amplifier 14 linearly amplifies the second output light R input from the optical delay device 13 at a predetermined amplification rate, and thereafter again inputs it as an input light to the nonlinear optical element 12. The reference numeral 15 designates an output part.

In the present embodiment, the input light L1 comprising an analog signal from the input part 11 is input to the nonlinear optical element 12. The nonlinear optical element 12 has a predetermined threshold value, and when as shown in FIGS. 2 and 3, the intensity I of the input light is below the threshold value $I_t$, the nonlinear optical element outputs as the first output light T a light of intensity $I_O$ shown in FIG. 2 which corresponds to a digital signal which means the digit 0, and as the second output light R a light of intensity $I_{RO}$ shown in FIG. 3 which is proportional to the intensity of the input light.

Also, when the intensity I of the input light is above the threshold value $I_t$, the nonlinear optical element outputs as the first output light T a light of intensity $I_1$ shown in FIG. 2 which corresponds to a digital signal which means the digit 1, and as the second output light R a light of intensity $I_{R1}$ proportional to the input light intensity I minus the threshold value as shown in FIG. 3.

Thus, the first output light T from the nonlinear optical element 12 is a step-like digital signal shown in FIG. 2, and the second output light R is an analog signal which, as shown in FIG. 3, is proportional to the input light intensity until the input light intensity is a predetermined value and which temporarily becomes 0 and again increases linearly in proportion to the input light intensity when the input light intensity reaches the predetermined value.

Figure 4:
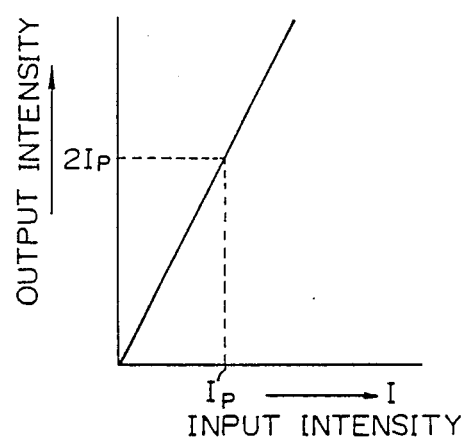
FIG. 4 is a graph showing the input and output characteristics of the optical amplifier shown in FIG. 1.

Of the output lights from the nonlinear optical element 12, the second output light R is caused to enter the optical delay device 13. The optical delay device 13 is provided in an arbitrary portion of a feedback system for amplifying the second output light from the nonlinear optical element 12 by the optical amplifier 14 and causing it to be again input to the nonlinear optical element 12, and delays the second output light by a predetermined time to take timing so that the information processed by the nonlinear optical element 12 may not mix with the previous optical information during feedback. The second output light R delayed by the optical delay device 13 enters the optical amplifier 14. In the optical amplifier 14, the input light is amplified at a predetermined amplification rate so as to be, for example, twice the input light intensity of the nonlinear optical element, as shown in FIG. 4.

As described above, according to the present embodiment, in the optical A-D converter means 10, a feedback system passing through the nonlinear optical element 12 is constructed for the input light L1 which is an analog signal, whereby the first output light T which is a digital signal is obtained from the optical A-D converter means 10.

Thus, the optical A-D converter of the present embodiment processes all information including the input to the output by light and A-D-converts it and therefore, has the feature that even if the number of quantization levels increases, that is, even if the number of bits increases, it can be executed by the same construction. It also has the feature that the harmony of image can be set appropriately because any number of bits can be obtained.

A specific example of the principle of operation of the present embodiment will now be described.

Figure 5:
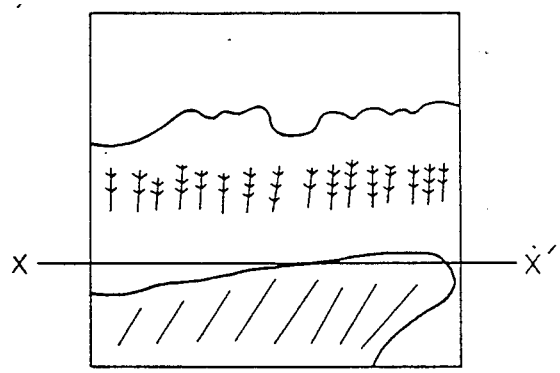
FIG. 5 shows an example of the input image to the optical A-D converter.
Figure 6A:
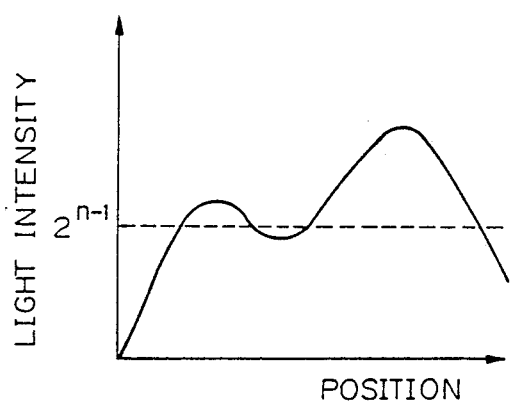
FIGS. 6A-9 illustrate the principle of the optical A-D conversion of plural bits using the embodiment of FIG. 1.

FIG. 5 shows an example of an image to be digitally converted which comprises a two-dimensional analog quantity. In the present embodiment, for simplicity, description will be made of a case where the image on the line X—X' of FIG. 5 is extracted and an analog image of the intensity distribution shown in FIG. 6A is converted into a digital image. In FIG. 6A, the horizontal axis represents the spatial position and the vertical axis represents the light intensity, and description will hereinafter be made of a case where it is digitalized into binary information of n bits.

Figure 6B:
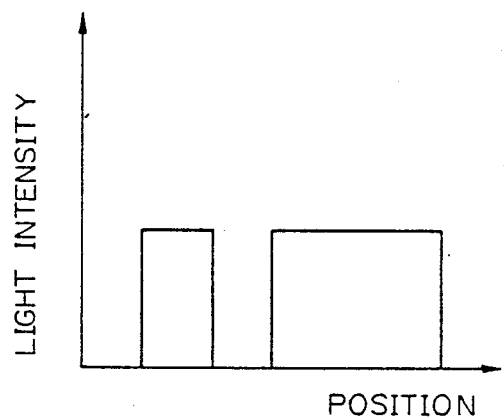
Figure 7A:
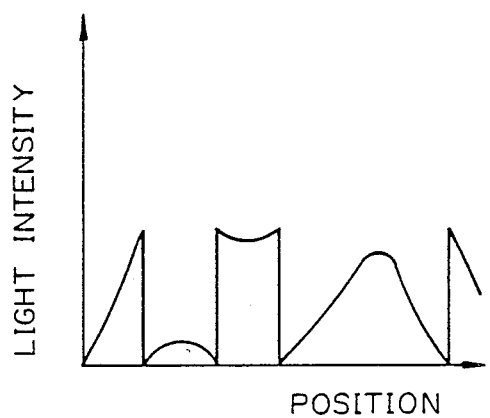

When the analog information of FIG. 6A is output from the input part 11 and reaches the nonlinear optical element 12, the first output light T becomes a digital output light shown in FIG. 6B with the preset value, for example, of input light intensity $2^{n-1}$ as the threshold value, and the second output light R becomes an analog output light shown in FIG. 7A which is FIG. 6A minus FIG. 6B.

The output form of FIG. 6B is such that a value corresponding to the digit 1 is output when the intensity of the input light exceeds the threshold value $2^{n-1}$, and a value corresponding to the digit 0 is output when the intensity of the input light does not exceeds the threshold value $2^{n-1}$. That is, it represents the most significant bit (MSB) of n bits.

Figure 7B:
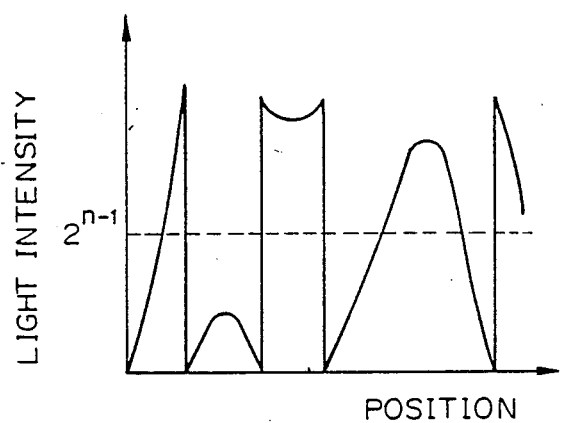

The output form of FIG. 7A represents the information in which the input light is below the threshold value $2^{n-1}$. The second output light R of the form shown in FIG. 7A is subjected to such amplification that with the loss in the feedback system taken into account, a value twice as great as the intensity in the nonlinear optical element processed and output at the threshold value $2^{n-1}$ re-enters the nonlinear optical element 12, and assumes the intensity distribution shown in FIG. 7B.

Figure 8A:
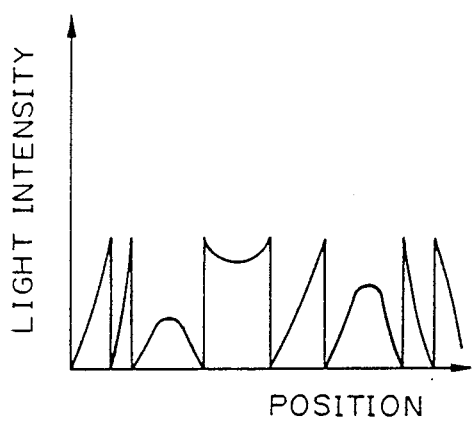
Figure 8B:
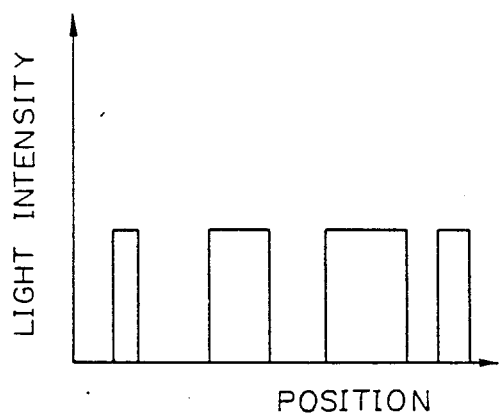

Accordingly, the threshold value of the nonlinear optical element 12 when re-input to the nonlinear optical element is constant, i.e., $2^{n-1}$, but the threshold value virtually discriminated is ½ of the value at the preceding time, i.e., $2^{n-2}$. Therefore, from the nonlinear optical element 12, a bit output of magnitude $2^{n-2}$ as shown in FIG. 8B is output as the first output light T and information of magnitude less than $2^{n-2}$ as shown in FIG. 8A is output as the second output light R.

Figure 9:
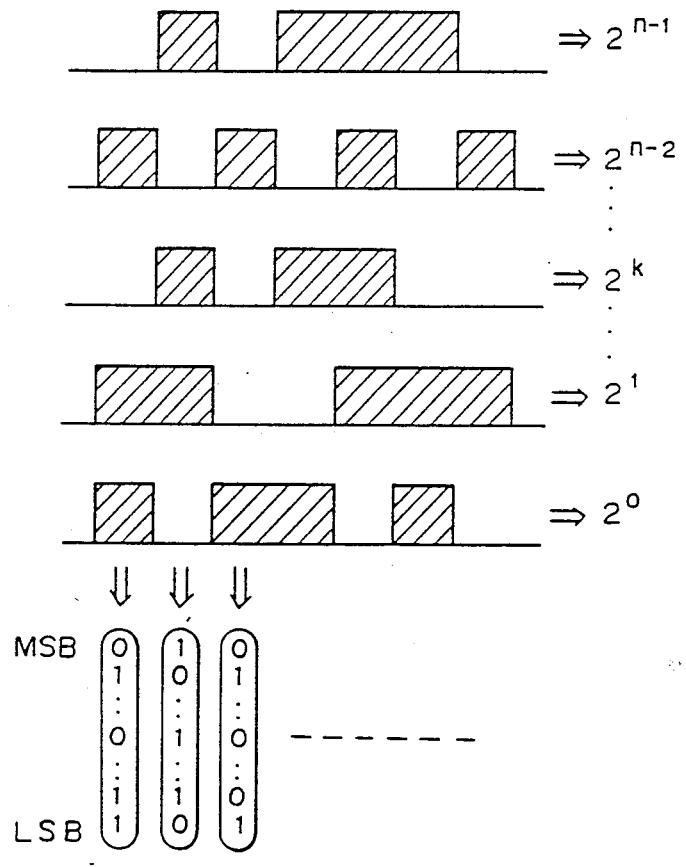

In the present embodiment, the above-described operation is repeated by the number of bits, whereby digitilized image information such as 1, 0, 1, 1, . . . as shown, for example, in FIG. 9 is obtained in succession from MSB ($2^{n-1}$) to LSB ($2^0$).

In FIG. 9, representation is made with the horizontal axis divided by picture elements.

In the foregoing description, the one-dimensional image information is parallel-processed, but of course, actually, two-dimensional image information is parallel-processed.

Figure 10:
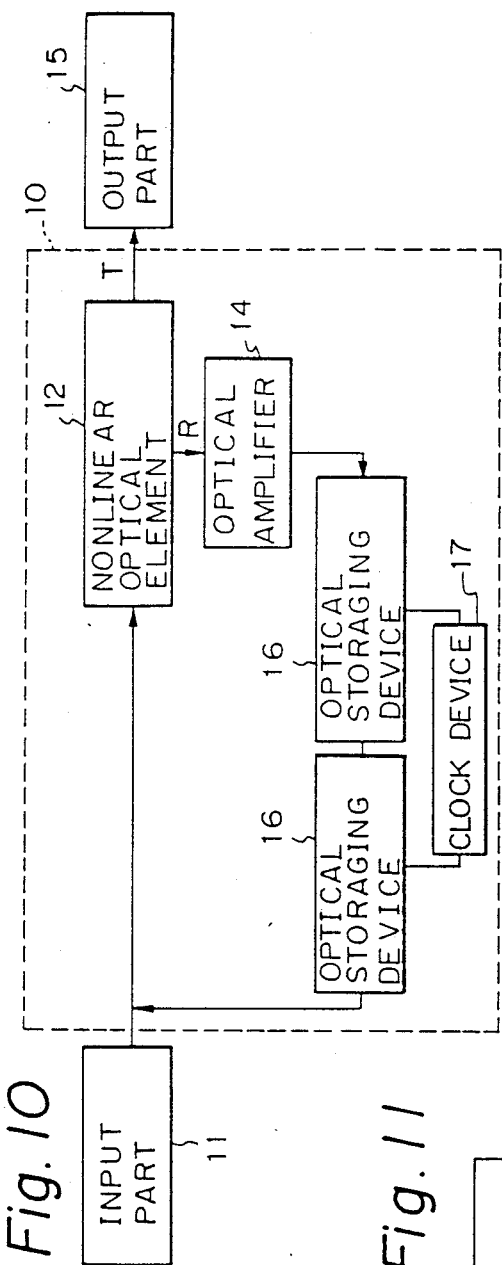
FIG. 10 is a block diagram showing a modification of the optical A-D converter of FIG. 1.

FIG. 10 is a block diagram showing a modification of the optical A-D converter shown in FIG. 1. In FIG. 10, members similar to those in FIG. 1 are given similar reference numerals and need not be described in detail. Here, instead of the optical delay device, use is made of a clock device 17 and an optical storage device 16 for inputting and outputting light in acccordance with a clock signal from the clock device 17. This modification has the advantage that the synchronization of the clock signal output from the clock device 17 is changed, whereby the delay time becomes variable and controllable.

Figure 11:
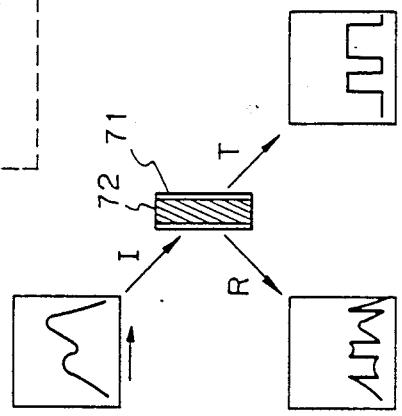
FIG. 11 is a schematic diagram illustrating a Fabry-Pérot resonator used as the nonlinear optical element.

Description will now be made of specific examples of the various components shown in FIGS. 1 and 10. FIG. 11 is a schematic diagram of an embodiment utilizing a Fabry-Pérot resonator as the nonlinear optical element 12 according to the present invention. In this embodiment, a substance 72 having a nonlinear refractive index is disposed in the Fabry-Pérot resonator 71 and the resonator conditions are varied by the incident light intensity I to thereby control the emergent light intensity.

That is, by specifically determining the selection of the reflectance of the resonator mirror, the film construction (the selection of the material and the setting of the film thickness), etc., two output lights, i.e., the first output light T and the second output light R, are obtained for the input light intensity I as shown in FIG. 11.

There are two types of optical amplifiers 14, one of which is the purely optical type and the other is the photoelectric type in which a variation is effected in the fashion of light-electricity-light during amplification. In the present embodiment, any of them is applicable as long as they can provide desired linear amplification.

As the purely optical type, there is one utilizing a laser for amplification. In this one, the incident light into a medium having a gain is amplified, and thereafter is caused to emerge. Any laser medium having a great gain will be usable if chosen in accordance with wavelength.

For example, an optical amplifier using an AlGaAs/-GaAs semiconductor laser, a metal vapor laser, a coloring matter laser or the like is applicable.

Figure 12:
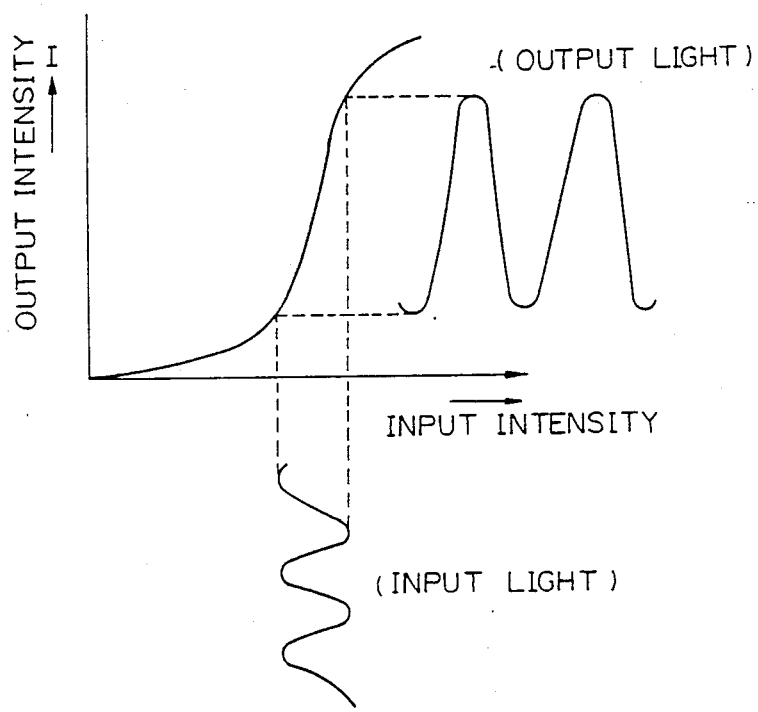
FIG. 12 is a graph showing an example of the input and output characteristics of the optical amplifier.

It is also possible to utilize a nonlinear element which utilizes the nonlinearity of the input and output characteristics to effect transistor-like amplification as shown, for example, in FIG. 12, or an element which mixes a signal light with a pump light in a crystal having a light inducing refractive index effect and transfers the energy of the pump light to the signal light, thereby effecting amplification.

Crystals having a great light inducing refractive index effect include $BaTiO_3$, $Bi_{12}SiO_{20}$, etc. Besides these, a spatial optical modulator such as BSO ($Bi_{12}SiO_{20}$) or liquid crystal may be utilized to constitute an optical amplifier.

As the photoelectric type, use may be made of a CCD, a phototransistor, a device comprising a combination of a photoconductive layer and PLZT or liquid crystal, or a device comprising a combination of a microchannel plate utilizing a photoelectron amplifying tube and $LiNbO_3$.

As an optical delay device 13 having a fixed delay time, there is one utilizing optical fiber. Where a short light pulse is utilized as the signal light, if it becomes a problem that the light pulse becomes long by the dispersion in the fiber, a phase-conjugate plate may be installed at the turned-back end of the fiber.

Also, as a device in which the delay time is variable and controllable, there is conceivable an optical storage device or a combination of a spatial optical modulator of the type utilizing electro-optical crystal such as BSO, PLZT, $BaTiO_3$ or $LiNbO_3$ or the type comprising a combination of a microchannel plate utilizing a photoelectron multiplying tube and $LiNbO_3$ and a clock device.

Specific examples of the construction of each embodiment of the present invention will now be described. FIGS. 13 to 16 are schematic diagrams of Embodiments 1 to 4, respectively, of the present invention. In FIGS. 13 to 16, the reference numeral 10 designates optical A-D converter means.

Figure 13:
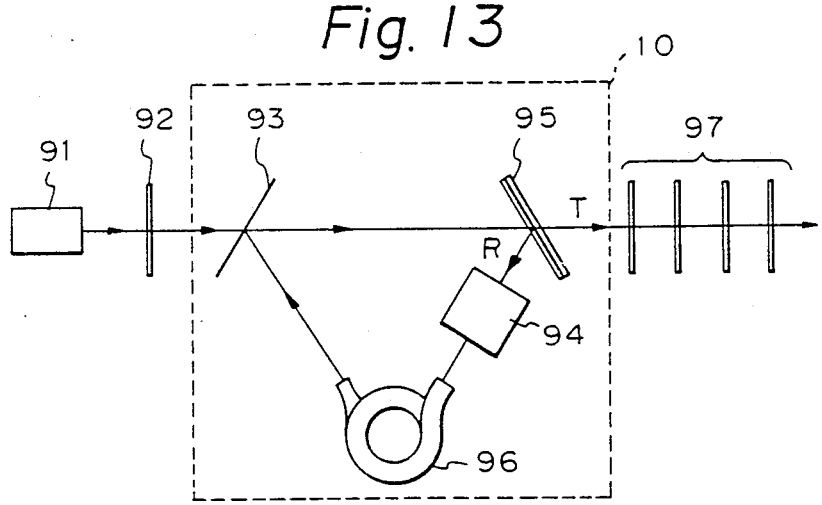
FIGS. 13-18 schematically show specific examples of the construction of the optical A-D converter shown in FIG. 1.

In Embodiment 1 shown in FIG. 13, 4-bit optical A/D conversion is effected. In this figure, the reference numeral 91 designates an illuminating light source comprising a GaAlAs/GaAs semiconductor laser (wavelength 830 nm) or the like. The reference numeral 92 denotes an analog input image comprising, for example, a black-and-white film. The reference numeral 93 designates a beam splitter, and the reference numeral 94 denotes an optical amplifier comprising a GaAlAs/GaAs semiconductor laser or the like. The reference numeral 95 designates a nonlinear optical element comprising an optical bistable element or the like having MQW (multi quantum well) structure in which GaAs and GaAlAs are alternately layered. The reference numeral 96 denotes an optical delay device using optical fiber so that the delay time may be of a length corresponding to 1-bit processing time. In the following embodiments, identical elements are given identical reference numerals.

In the present embodiment, the analog input image 92 input to the nonlinear optical element 95 outputs a bit output of magnitude $2^3$ as the first output light T and at the same time, outputs the remaining analog image information of less than $2^3$ as the second output light R toward the optical amplifier 94. The second output light R is amplified by the optical amplifier 94 and delayed by the optical delay device 96, whereafter it is reflected by the beam splitter 93 and is input to the nonlinear optical element 95 in the same process as previously described, and then a bit output of magnitude $2^2$ is output as the first output light T from the nonlinear optical element 95 and at the same time, analog image information of less than $2^2$ is output as the second output light R toward the optical amplfier 94. Thereafter, in the same manner, digital image information corresponding to $2^1$ and $2^0$ is output as the first output light from the nonlinear optical element 95 in confirmity with the number of bits.

In the present embodiment, pulse light of 100 nsec. is used as the input light, and the response time of the optical amplifier and of the nonlinear optical element is about 10 nsec. and the relaxation time of the nonlinear optical element is about 40 nsec.

The length of the optical fiber is 100 m in order that one round time may be 500 nsec. After all, 2 $\mu$sec. has been required for processing 4 bits. However, in the present processing, the image information is parallel-handled and therefore, the substantial processing speed is very high.

Also, in the present embodiment, 10-bit optical A-D conversion has been effected by a similar construction.

Fabry-Pérot Etalon having InSb as a nonlinear medium has been used as the nonlinear optical element 95. By a carbon dioxide laser of wavelength 10.6 $\mu$m being used as the illuminating light source 91, laser light excites InSb, and at this time, the nonlinear optical element 95 exhibits the input and output characteristics of FIGS. 2 and 3. The response time and relaxation time are about 1 $\mu$sec. The optical amplifier has been realized by disposing a carbon dioxide laser which does not form a resonator and exciting natural emitted light to such a degree as not to violate the signal level of the present system. Accordingly, the time during which the light passes through the optical amplifier 94 can be neglected.

Fiber for infrared having a length of 500 m which comprises KRS-5 (TlBr-TlI) has been used as the optical delay device 96 and a delay time of 5 $\mu$sec. has been obtained. As a result, the 10-bit processing time is about 50 $\mu$sec.

Figure 14:
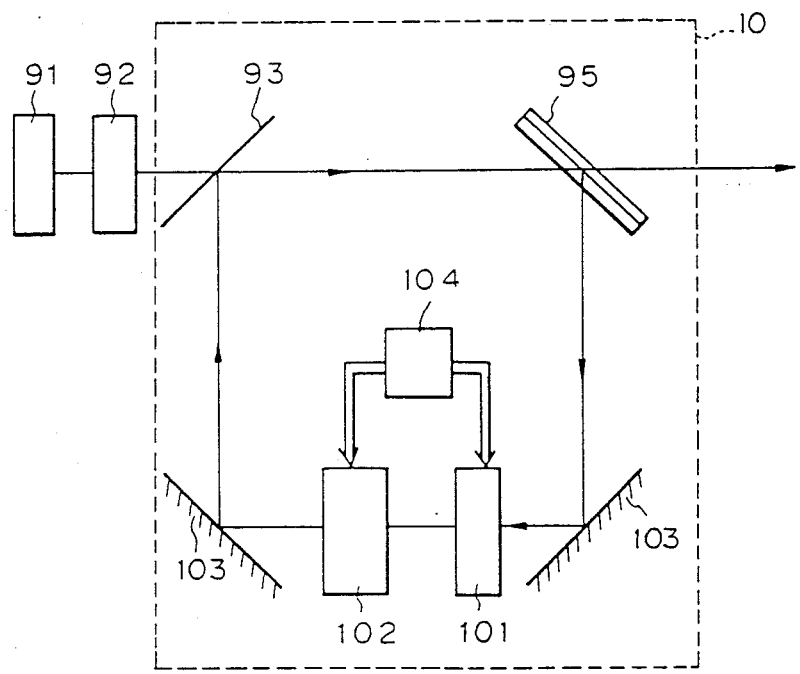

In Embodiment 2 shown in FIG. 14, 8-bit optical A-D conversion is effected. In this embodiment, optical delay is effected by a combination of optical storage devices and a clock device, instead of optical fiber.

In FIG. 14, the reference numerals 101 and 102 designate optical storage devices each comprising a spatial optical modulator or the like which comprises a combination of BSO and liquid crystal, and the response time thereof is about 1 msec. The optical storage device 101 has the optical amplifying function. The reference numeral 103 denotes a reflecting mirror, and the reference numeral 104 designates a clock device which controls the optical storage devices 101 and 102 at an interval of about 5 msec.

In the present embodiment, optical delay is effected in the following manner. When the optical storage device 101 is in its set condition and the optical storage device 102 is in its waiting condition, image information is stored from the nonlinear optical element 95 into the optical storage device 102 through the optical storage device 101. Next, when the optical storage device 102 is in its set condition and the optical storage device 101 is in its waiting condition, image information is stored into the optical storage device 101 via the nonlinear optical element 95. When the optical storage device 101 again assumes its set condition, the image information is amplified and emerges, and is stored into the optical storage device 102. What has been described above is repeated by the number of bits to thereby accomplished processing.

In the present embodiment, an Ar laser (wavelength 514.5 nm) is used as the illuminating light source 91, and an interference filter comprising alternately disposed ZnSe and ThF$_4$ is used as the nonlinear optical element 95. The nonlinear optical element 95 absorbs the Ar laser light and varies its own refractive index, and outputs the first output light and the second output light as shown in FIGS. 2 and 3. The response time is about 1 msec.

By the processing time of each element as described above, the one round time of the light signal in the present embodiment is 10 msec., and about 80 msec. is required for the processing of 8 bits.

If, for example, the resolution of the film is 1000 × 1000, the processing speed per picture element can be made as high as 1 $\mu$sec. or less.

Figure 15:
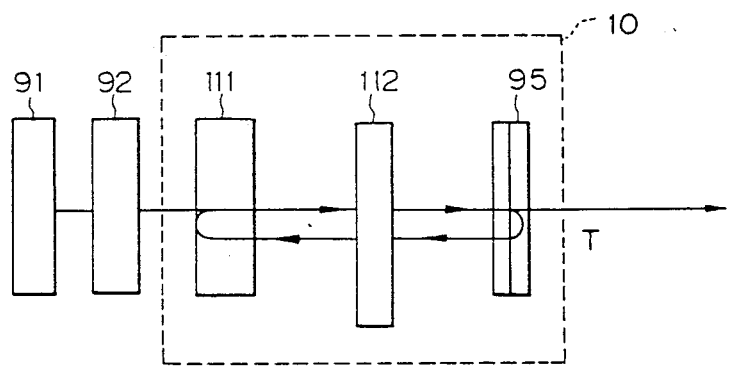

In Embodiment 3 shown in FIG. 15, the information from the analog input image 92 is reciprocated through an optical A-D converter comprising an optical amplifier 111, an optical delay device 112 and a nonlinear optical element 95 in conformity with the number of bits, whereby a digital image is obtained as the first output light T from the nonlinear optical element 95.

The optical amplifier 111 has the function of amplifying the reflected light, and the optical delay device 112 sufficiently delays the pulse light so that the incident light to the optical amplifier 111 may not mix with the emergent light therefrom.

The nonlinear optical element 95 and the optical amplifier 111 each comprise GaAs and accordingly, the illuminating light source 91 also uses the light of wavelength 830 nm from a GaAs semiconductor laser. The duration time of the light pulse is 10 nsec., the response time of the nonlinear optical element 95 is 5 nsec., the relaxation time of the nonlinear optical element 95 is 40 nsec., and the necessary time of the optical amplifier 111 is negligible as compared with the foregoing. In order to make the optical delay time 100 nsec., the optical fiber has been made as long as 20 m. Thus, the bit rate is 100 nsec.

Figure 16:
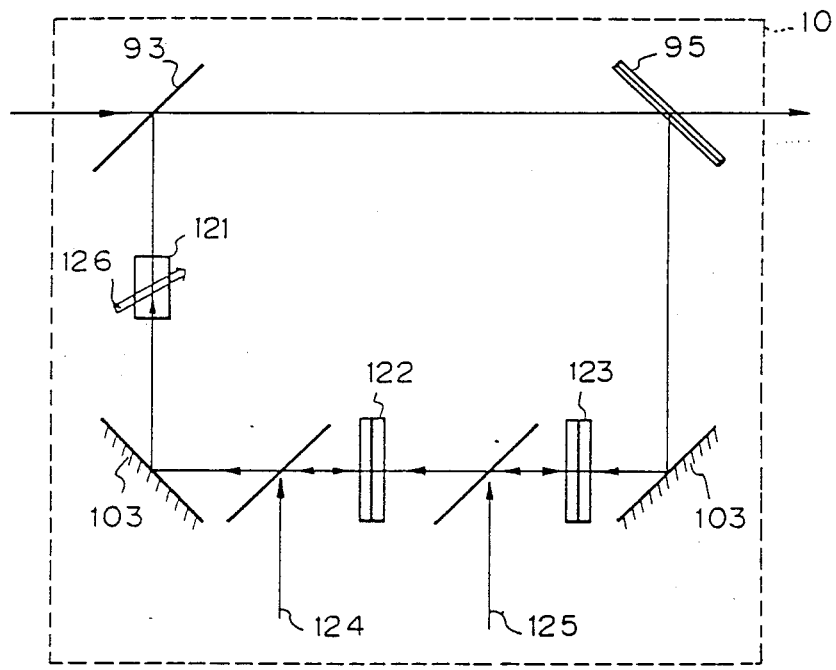

In Embodiment 4 shown in FIG. 16, the outside light is utilized to effect optical delay and optical amplification.

In FIG. 16, the reference numeral 121 designates an optical amplifier using a mixture of two waves utilizing the light inducing refractive index effect of BaTiO$_3$ (barium titanate). The optical amplifier 121 effects optical amplification by giving and taking the energy of the signal light in the loop and the energy of the pump light for outside control. The reference numeral 126 denotes the pump light which gives energy to the signal light. The reference numerals 122 and 123 designate optical writing type spatial optical modulation elements each comprising a combination of ZnS and liquid crystal, and the reference numerals 124 and 125 denote control lights for controlling the spatial optical modulation elements 122 and 123, respectively, and effecting reading-out.

Also, the nonlinear optical element 95 is an interference filter similar to that used in FIG. 14. Accordingly, the light source used in the present embodiment is an Ar laser (wavelength 514.5 nm) entirely similar to that in FIG. 14.

Operation will be described hereinafter. In a first condition, the control light 124 is applied to the spatial optical modulation element 122 and the optical amplifier 121, which are thus in an ON state. The control light 125 is not applied to the spatial optical modulation element 123, which is thus in an OFF state. At this time, the light having emerged from the spatial optical modulation element 122 reaches the optical amplifier 121 and is amplified thereby to operate the nonlinear optical element 95. The digitalized output light emerges to the outside, and the remaining information light is written into the spatial optical modulation element 123. In a second condition, the spatial optical modulation element 122 and the optical amplifier 121 are not subjected to irradiation and are in the OFF state. Conversely, the control light 125 is applied to the spatial optical modulation element 123 and is in the ON state. At this time, the information having emerged from the spatial optical modulation element 123 is written into the spatial optical modulation element 122. The processing of 1 bit is effected via the above-described process. Thereafter, the first and second processes are successively repeated in a similar manner, whereby optical A-D conversion is accomplished.

Figure 17:
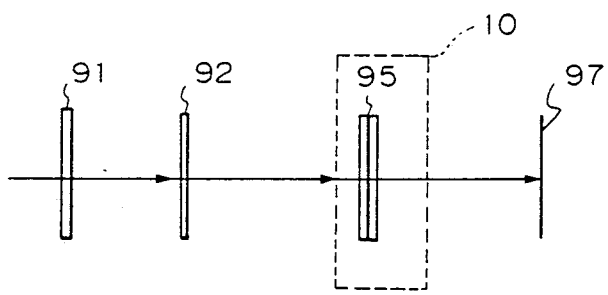

All of the above-described embodiments have an optical feedback system, but where optical A-D conversion of 1 bit is effected, the feedback system is unnecessary as shown in FIG. 17. In FIG. 17, the analog input image 92 is illuminated by the illuminating light source 91 and is passed through the nonlinear optical element 95, whereafter it is output as a binarized digital output image 97.

In the present embodiment, it is possible to convert a two-dimensional analog image into a digital image in a moment with a simple construction.

Figure 18:
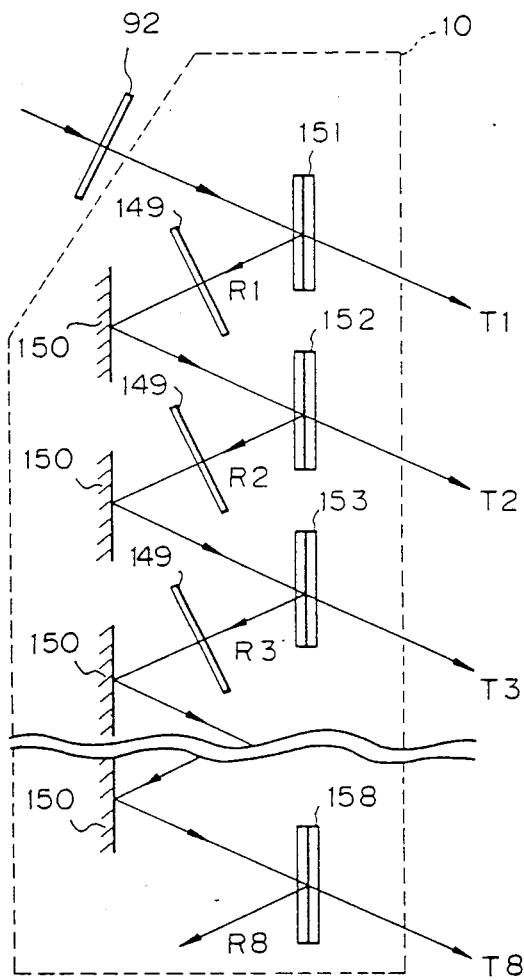

Also, if a plurality of nonlinear optical elements are used as shown in FIG. 18, optical A-D conversion of plural bits can be accomplished without the use of a feedback system.

In the embodiment of FIG. 18, optical A-D conversion of 8 bits is effected. In FIG. 18, the reference numerals 151-158 designate nonlinear optical elements, and the reference numeral 150 denotes a reflecting mirror. The analog input image 92 is input to the first nonlinear optical element, and the first output light T1 which is a digital signal is transmitted therethrough. Also, the second output light R1 which is an analog signal is reflected, and is further reflected by the reflecting mirror 150, whereafter it is input to the second nonlinear optical element 152. The second output light T2 which is a digital signal is transmitted through the second nonlinear optical element 152, and the second output light R2 which is an analog signal is reflected and is input to the third nonlinear optical element 143 via the reflecting mirror 150.

Thereafter, in a similar manner, the first output lights T3-T8 are successively obtained from the nonlinear optical elements 153-158.

An optical amplifier 149 similar to the optical amplifier shown in FIG. 1 is disposed between each nonlinear optical element and the reflecting mirror 150. That is, the optical amplifier 149, with the loss of light on the way taken into account, amplifies the incident light so that the intensity of the incident light is twice that of the next nonlinear optical element.

In the present embodiment, the bit plane of the most significant bit (MSB) is obtained from the nonlinear optical element 151, and the bit plane of the least significant bit (LSB) is obtained from the nonlinear optical element 158.

In the present embodiment, an optical delay device is not specially required. Therefore, the entire processing time is determined by only the response times or the nonlinear optical elements and the optical amplifier.

Figure 19:
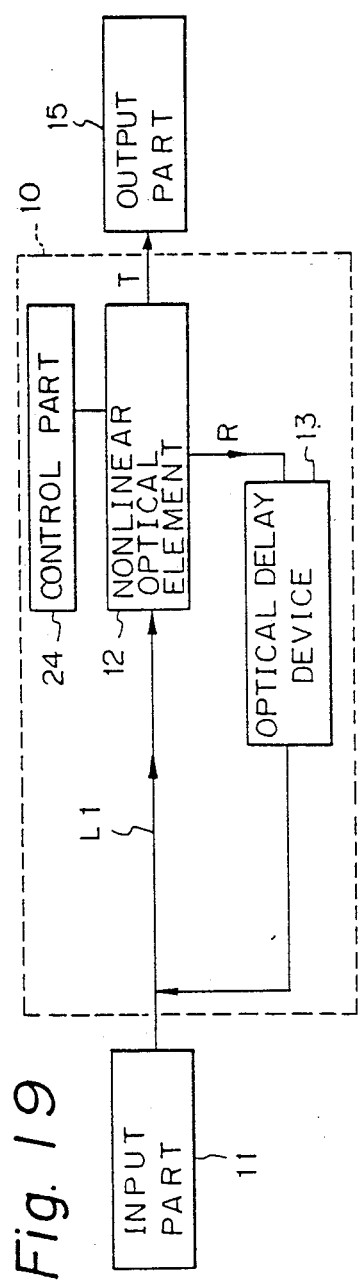
FIG. 19 is a block diagram showing another embodiment of the optical A-D converter of the present invention.

In the present invention, optical A-D conversion of plural bits can likewise be accomplished even if means for controlling the threshold value of the nonlinear optical element 12 is provided instead of the optical amplifier 14 shown in FIG. 1. Such embodiment is shown in the block diagram of FIG. 19. In FIG. 19, members identical to those in FIG. 1 are given identical reference numerals and need not be described in detail. Here, the reference numeral 24 designates a control part for controlling the threshold value of the nonlinear optical element 12.

The control of the threshold value of the nonlinear optical element 12 by the control part 24 depends on the type of the nonlinear optical element 12. For example, in the case of a light-light type nonlinear optical element, a bias light is caused to enter so as to operate the threshold value level. Also, in the case of a light-electricity-light type nonlinear optical element, a bias light is caused to enter or bias is electrically applied to effect adjustment.

Figure 20:
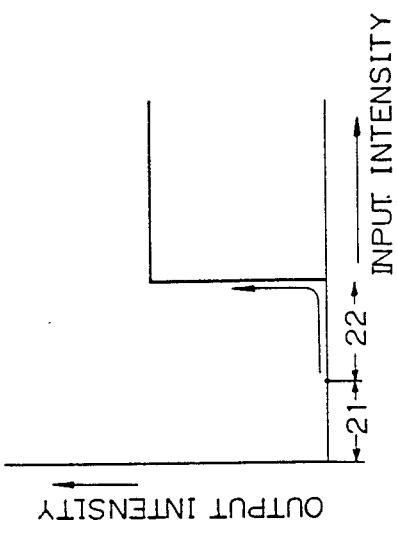
FIGS. 20-22B illustrate the principle of the optical A-D conversion of plural bits using the embodiment of FIG. 19.

By such a method, bias 21 is applied by the extraneous input of electrical or optical power as shown in FIG. 20 to adjust the apparent threshold value 22.

A specific example of the principle of operation of the present embodiment will now be described.

Figure 21A:
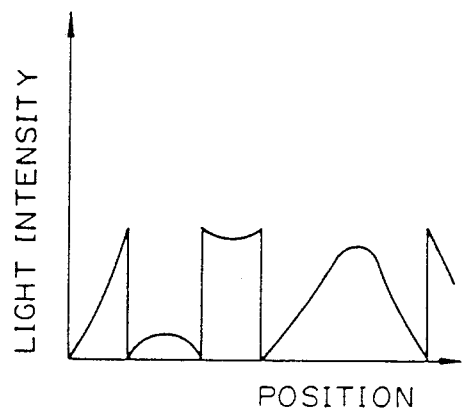

First, when the analog information of FIG. 6A is output from the input part 11 and reaches the nonlinear optical element 12, bias is applied from the control part so that, for example, the value of input light intensity $2^{n-1}$ becomes the threshold value, and the first output light T becomes the digital output light shown in FIG. 6B, and the second output light R becomes the analog output light shown in FIG. 21A which is FIG. 6A minus FIG. 6B.

The output form of FIG. 6B outputs a value corresponding to the digit 1 when the intensity of the input light exceeds the threshold value $2^{n-1}$, and outputs a value corresponding to the digit 0 when the intensity of the input light does not exceed the threshold value $2^{n-1}$. That is, it is representative of the most significant bit (MSB) of n bits.

The output form of FIG. 21A is representative of the information in which the input light is less than the threshold value $2^{n-1}$. The second output light R of the form shown in FIG. 21 passes through the optical delay device 13 and is again input to the nonlinear optical element 12.

Figure 21B:
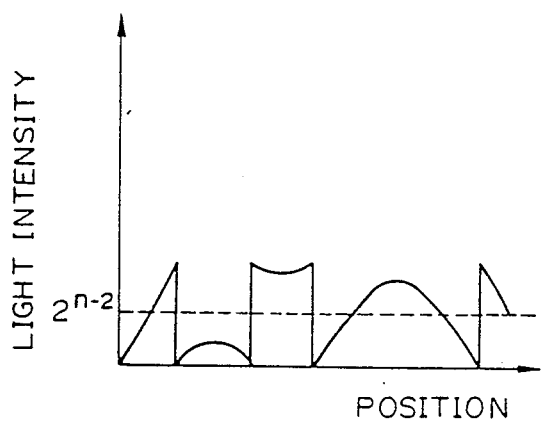

At this rime, the second output light having the information shown in FIG. 21A is decreased in quantity of light as shown, for example, in FIG. 21B under the influence of the reflectance of the nonlinear optical element, the reflecting mirror of the feedback system, the reflectance of the beam splitter, etc. That is, it undergoes a loss of light in the feedback system. Accordingly, bias is applied to the nonlinear optical element by an amount corresponding to the amount of loss to thereby bottom up the threshold value, whereby an apparent reduction in the threshold value is made.

Also, the discriminated analog quantity is a quantity corresponding to $2^{n-2}$ which is ½ of the threshold value $2^{n-1}$ at the preceding time and therefore, the bottom-up by the bias is further effected by an amount corresponding to $2^{n-2}$, whereby a reduction in the threshold value is likewise made.

Figure 22A:
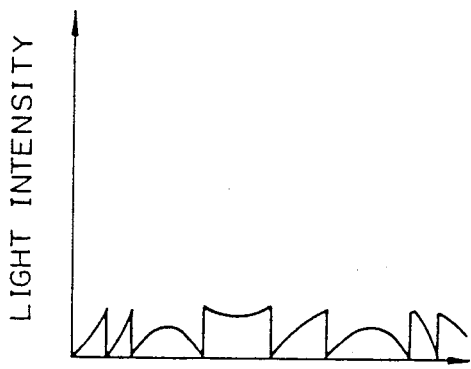
Figure 22B:
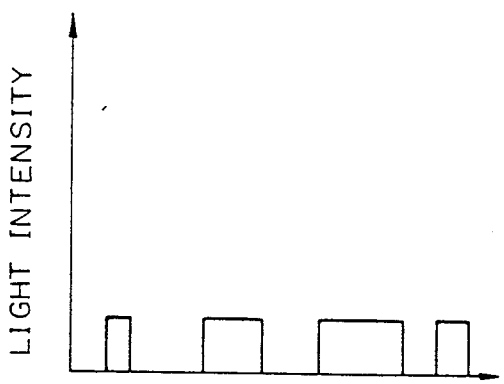

For the reason set forth above, a reduction in the threshold value is made by the supply of bias power from the control part, whereby as shown in FIG. 21B, discrimination of a quantity corresponding to ½ of the analog quantity at the preceding time is always effected. Accordingly, the first output light obtained next time is a bit output of the magnitude $2^{n-2}$ shown in FIG. 22B, and the second output light R outputs information of less than $2^{n-2}$ shown in FIG. 22A.

In the present embodiment, the above-described operation is repeated by the number of bits, whereby digitalized image information such as 1, 0, 1, 1, ... as shown in FIG. 9 is obtained in succession from MSB ($2^{n-1}$) to LSB ($2^0$).

Figure 23:
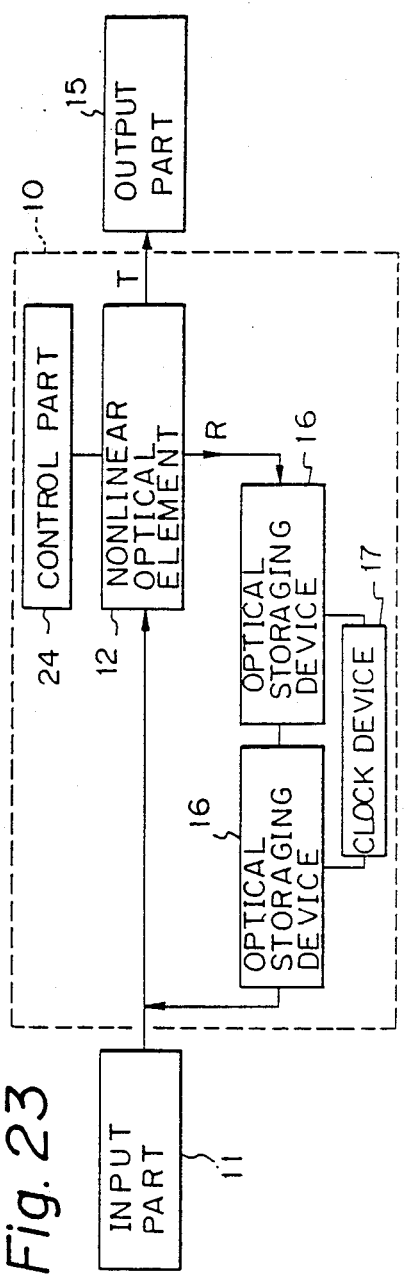
FIG. 23 is a block diagram showing a modification of the optical A-D converter of FIG. 19.

Again in the present embodiment, as shown in FIG. 23, optical storage devices 16 and a clock device 17 may be used instead of the optical delay device 13 shown in FIG. 19. Also, the nonlinear optical element 12 may be a nonlinear Fabry-Pérot resonator, as in the embodiment of FIG. 1. In such case, the control part may preferably be comprised of a combination of a laser source whole laser light is directly output-controlled or which has a predetermined output and an outside modulator. A semiconductor laser is best suited as the laser which is directly modulated.

Specific examples of the construction of the converters of FIGS. 19 and 23 will now be described. FIG. 24 to 27 are schematic diagrams of Embodiments 5 to 8, respectively, of the present invention. In these figures, members identical to those in FIGS. 13-16 are given identical reference numerals and need not be described in detail.

Figure 24:
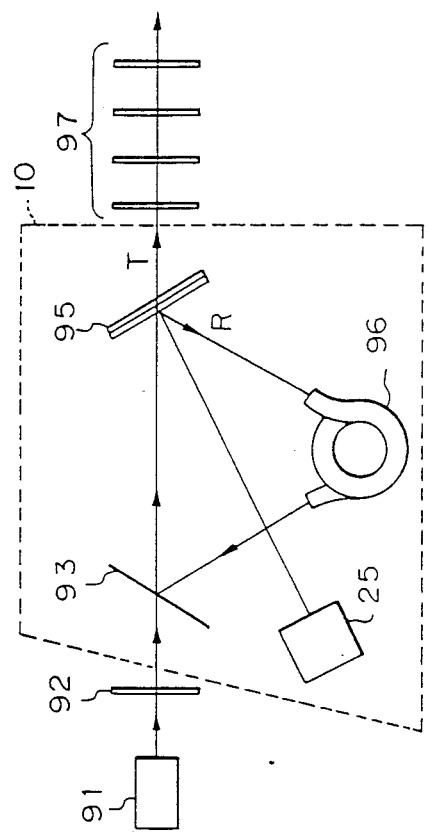
FIGS. 24-30 schematically show specific examples of the construction of the optical A-D converter shown in FIG. 19.

FIG. 24 shows an embodiment in which a control part 25 is provided instead of the optical amplifier 94 shown in FIG. 13. This control part 25 varies the threshold value of the nonlinear optical element 95 each time light is fed back, and effects optical A-D conversion of 4 bits in accordance with the principle described in connection with FIGS. 20-22B.

Figure 25:
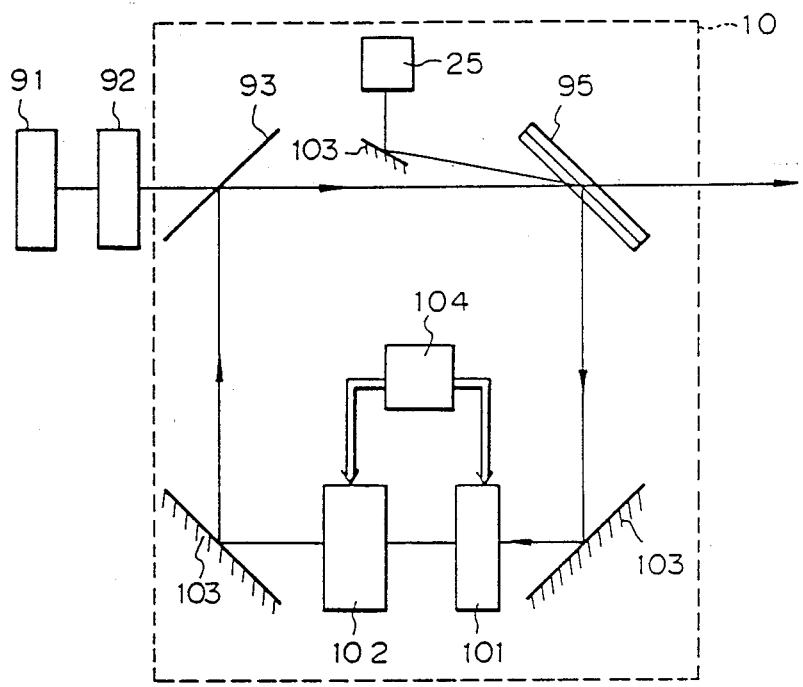

In Embodiment 6 of FIG. 25, optical A-D conversion of 8 bits is effected. In this embodiment, a control part for controlling the threshold value of the nonlinear optical element 95 is provided and light is fed back in a manner similar to that described with reference to FIG. 14. Here the optical storage device 101 need not always have the amplifying function.

Figure 26:
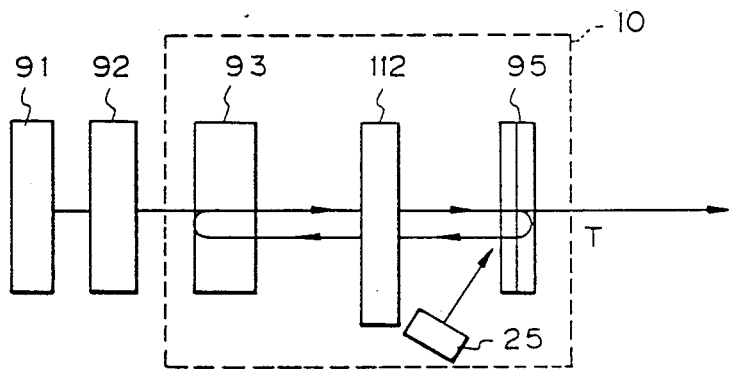

In Embodiment 7 shown in FIG. 26, the information from the analog input image 92 is reciprocated through an optical A-D converter comprising a beam splitter 93, an optical delay device 112 and a nonlinear optical element 95 in conformity with the number of bits, whereby a digital image is obtained as the first output light T from the nonlinear optical element 95.

The optical delay device 112 sufficiently delays the pulse light so that the incident light to the nonlinear optical element 95 may not mix with the emergent light therefrom.

The nonlinear optical element 95 and the control part 25 consists of GaAs and accordingly, the illuminating light source 91 also uses a light of wavelength 830 nm from a GaAs semiconductor laser. The duration time of the light pulse is 10 nsec., the response time of the nonlinear optical element 95 is 5 nsec., and the relaxation time of the nonlinear optical element 95 is 40 nsec. In order to make the optical delay time 100 nsec., the optical fiber has been made as long as 20 m. Thus, the bit rate is 100 nsec.

Figure 27:
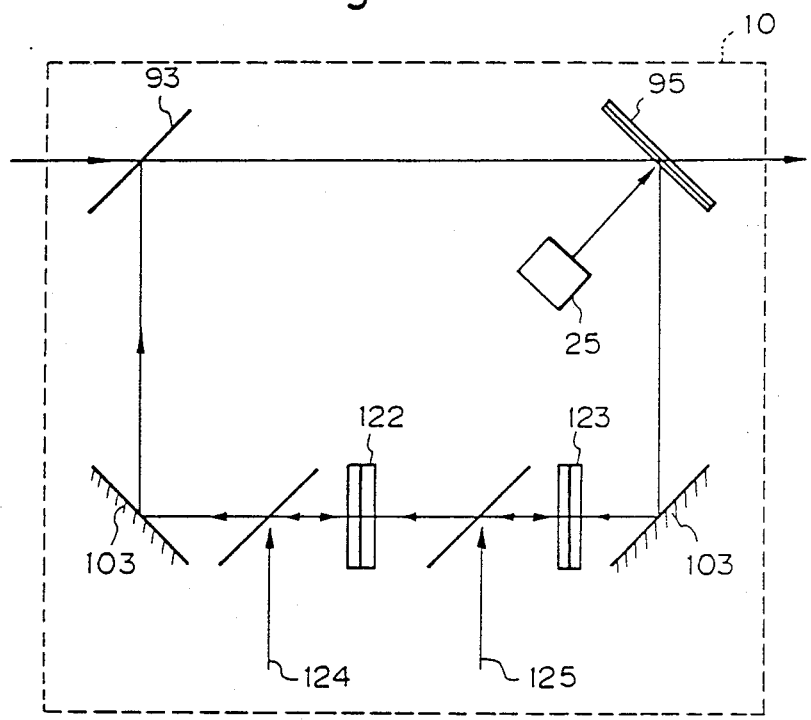

In the embodiment of FIG. 27, a control part 25 is provided instead of the optical amplifier 121 shown in FIG. 16. The feedback and delay are effected as in FIG. 16, and optical A-D conversion is accomplished.

Figure 28:
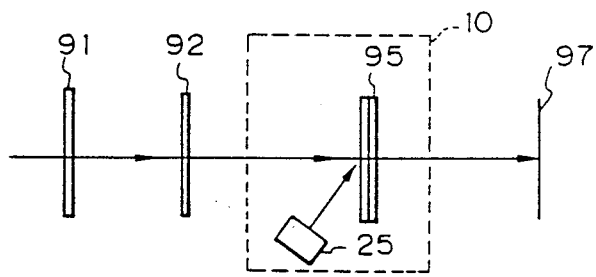

In FIG. 17, a 1-bit optical A-D converter has been described, but a control part 25 for controlling the threshold value of the nonlinear optical element 95 may be added thereto to thereby provide a construction as shown in FIG. 28. In such case, by varying the threshold value, binarization at a desired slice level becomes possible.

Figure 29:
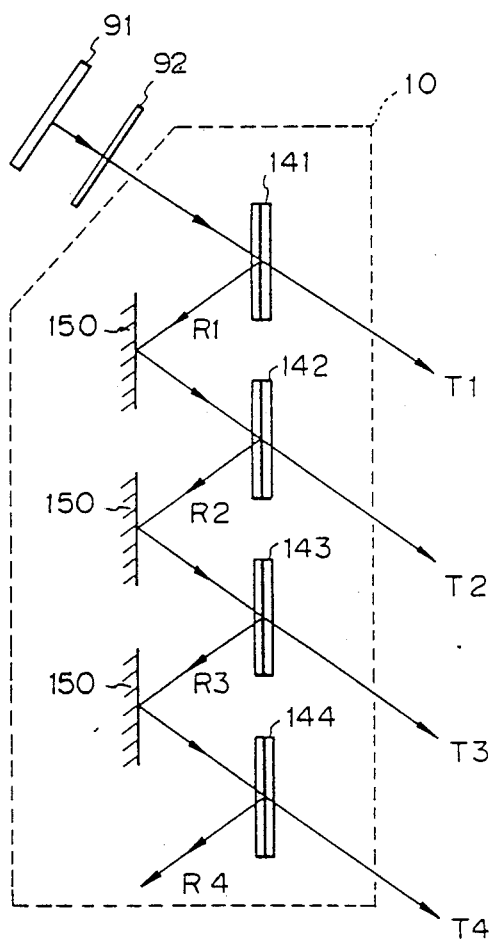

FIG. 29 shows an embodiment in which optical A-D conversion of 4 bits is effected without the use of a feedback system. In FIG. 29, the reference numerals 141-144 designate nonlinear optical elements, and the reference numeral 150 denotes a reflecting mirror. The analog input image 92 is input to the nonlinear optical element 141, and the first output light T1 which is a digital signal is transmitted therethrough. Also, the second output light R1 which is an analog signal is reflected by the nonlinear optical element 141, and is further reflected by the reflecting mirror 150, whereafter it is input to the second nonlinear optical element 142. The second output light T2 which is a digital signal is transmitted through the second nonlinear optical element 142, and the second output light R2 which is an analog signal is reflected by the second nonlinear optical element 142, and is input to the third nonlinear optical element 143 via the reflecting mirror 150.

Thereafter, the first and second output lights T3 and T4 are likewise obtained in succession from the nonlinear optical elements 143 and 144.

The threshold value of each nonlinear optical element in the present embodiment is set so as to be lower by ½ in the order of passage of light. For example, from the nonlinear optical element 141, the bit plane of the most significant bit is obtained. Thereby, decision of a less significant digit in the preceding stage is made. That is, binary images corresponding to respective digits of $2^3$, $2^2$, $2^1$ and $2^0$ are successively obtained from the first output lights T1–T4 from the nonlinear optical elements 141–144.

Figure 30:
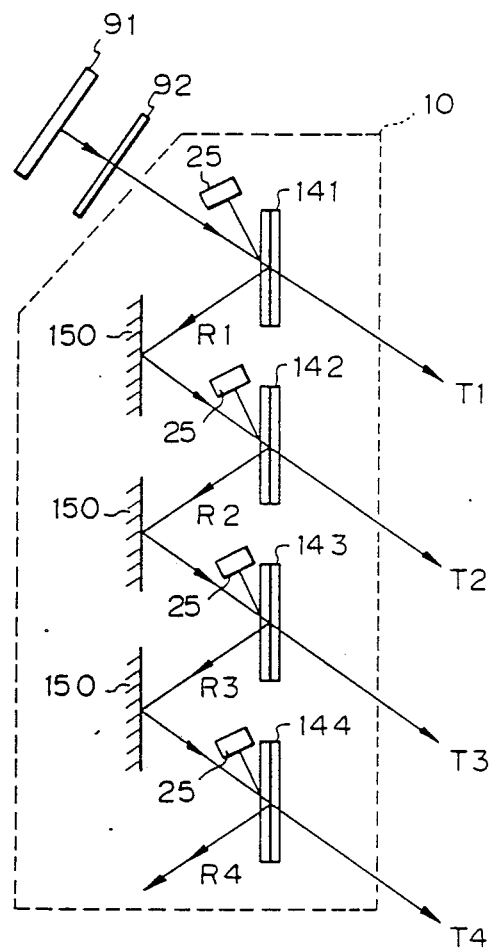

Also, a control part 25 may be provided for each of these nonlinear optical elements 141–144 to thereby provide a construction as shown in FIG. 30.

In the above-described embodiments, for simplicity, there has been shown a case where a monochromatic image, for example, a black-and-white image, is used as the analog input image, but the present invention is also applicable to a case where a polychromatic image is used. An example of it will be shown below.

Figure 31:
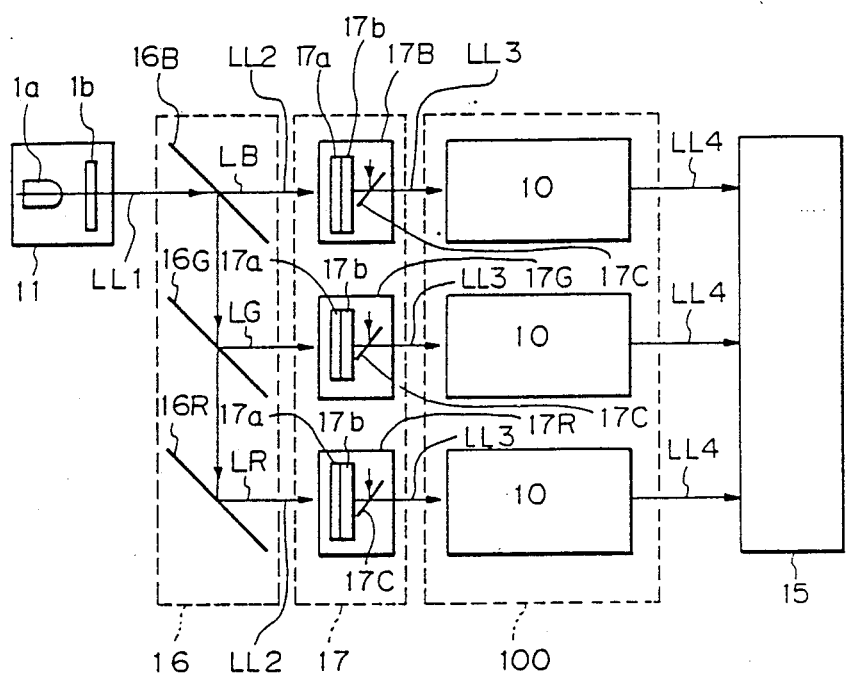
FIGS. 31-31 are schematic diagrams illustrating the construction of the present invention as it is applied for the optical A-D conversion of a polychromatic image.

FIG. 31 is a block diagram showing an embodiment in which a polychromatic image is used as the image to be processed. Here, the reference numeral 100 designates an optical A-D converting part, and the optical A-D converter means in the previously described various embodiments can be intactly applied as 10.

As input part 11 has a white light source 1a and a polychromatic image 1b to be processed. The polychromatic image 1b may be, for example, a color film, a color print, CRT or a liquid display device.

The present embodiment uses a transmitted light, but depending on the kind of polychromatic image 1b, a reflected light may be used in some cases. The reference numeral 16 dentoes three-primary-color separating means. The input part 11 inputs to the three-primary-color separating means 16 a polychromatic input light LL1 comprising an analog quantity such as image information to be A-D-converted. In the present embodiment, the three-primary-color separating means 16 separates the polychromatic input light LL1 from spatially polychromatic image information into image information lights LB, LG and LR of three primary colors and outputs them.

The reference numeral 17 designates wavelength converting means having three wavelength conversion elemetns 17B, 17G and 17R, which convert the lights LR, LG and LB of the input three primary colors into lights LL3 of the same wavelength and output them. The optical A-D converter means 10 digitally process analog image information comprising a predetermined wavelength, and inputs it as lights LL4 of the predetermined wavelength of the digital image information to an output part 15.

In the present embodiment, in the input part 11, the polychromatic input light LL1 is applied from the polychromatic image 1b to be processed and a white light is applied to the polychromatic image 1b, whereby the transmitted light or the reflected light from the polychromatic image is obtained, but where an image to be processed is depicted on a light-emitting type display device, the light emitted therefrom may be used as the polychromatic input light LL1.

Figure 32:
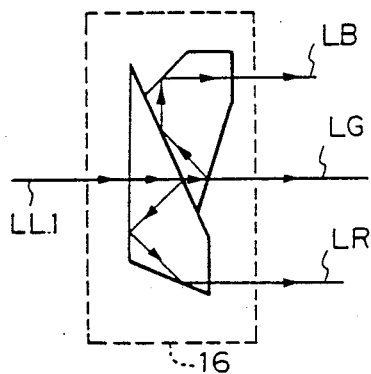

The three-primary-color separating means 16 may be, for example, interference filters of multilayer film, or a color resolving prism as shown in FIG. 32. The present embodiment is shown as using interference filters. A blue filter 16B transmits the blue light therethrough and reflects the green light and the red light, a green filter 16G reflects the green light and transmits the red light therethrough, and a red filter 16R reflects the red light, whereby there is obtained image information of the color lights LB, LG and LR separated into three primary colors.

The wavelength conversion elements 17B, 17G and 17R of the wavelength converter means 17 read out the image information written at the input wavelength by lights of various wavelengths to thereby obtain the same image by lights of different output wavelengths, and each of these means usually comprises a light receiving portion and a light modulating portion.

The sensitivity of the light receiving portion differs depending on the wavelength and therefore, the intensity of the read-out light is adjusted in conformity with the sensitivities of the three primary colors. As the adjusting method, for example, the intensities of the lights of three primary colors may be converted into the wavelength of the optical A-D converter means 10 for single color so as to be in accord with the relative luminosity factor, or may be controlled in accordance with a particular rule.

In the present embodiment, so-called optical depiction type spatial optical modulators are used as the wavelength conversion elements 17B, 17G and 17R. CdS having photoconductivity is used as a light receiving layer 17a, and liquid crystal causing a variation in electric field by the utilization of the fact that the electric field of CdS varies in conformity with the quantity of received light is used as an optical modulating layer 17b.

Besides CdS, a photodiode or phototransistor using a semiconductor may be used as the light receiving layer 17a. Also, besides liquid crystal, PLZT, $LiNbO_3$, $Bi_{12}SiO_{20}$ or the like having the electro-optical effect may be used as the optical modulating layer 17b. Further, a light-emitting diode, a semiconductor laser or the like may be used as the means for outputting lights of the same wavelength.

In the present embodiment, an image corresponding to each color is depicted into each light receiving layer 17a, whereafter lights of the same wavelength are caused to enter each optical modulating layer 17b through a polarizing beam splitter 17c, whereby an image having the information of each color comprising the same wavelength is obtained as reflected light through the polarizing beam splitter 17c.

FIG. 33 is a block diagram of another embodiment of the optical A-D converter for polychromatic image. In FIG. 33, elements identical to those in FIG. 31 are given identical reference numerals.

In this embodiment, the image information of a particular color is time-serially separated and extracted from polychromatic image information. The input part 11 has the function of the three-primary-color separating means 16 shown in FIG. 31, and inputs to the wavelength converting means 17 a light LLL1 obtained by separating and extracting the information of a particular color, for example, from polychromatic image information comprising an analog quantity to be subjected to optical A-D conversion. Designated by 1c in the input part 11 is a light source unit having light sources 11B, 11G and 11R which selectively emit lights of three primary colors. The light sources of respective colors are alternately turned on to illuminate a polychromatic image 1b, thereby outputting the light LLL1 of three primary colors.

Besides this, for example, a white light source and color filters of three primary colors may be used to illuminate the polychromatic image to thereby obtain a light of three primary colors. The wavelength converting means 17 comprises a wavelength conversion element, and converts the input light LLL1 of a particular color into a light LLL2 having a predetermined wavelength while having the information of the intensity of the image and inputs it to the optical A-D converter means 10 for single color similar to the optical A D converter means in the previously described various embodiments which corresponds to the predetermined wavelength.

The optical A-D converter means 10 A-D-converts the input image and inputs it to output means 15 as a light LLL3 of a predetermined wavelength of the digital image information. It effects such processing on the information of a different particular color in the same manner.

Usually, three primary colors, i.e., red, green and blue, are chosen as particular colors, and the aforedescribed processing steps are successively carried out for respective ones of these colors.

In the present embodiment, the processing can be accomplished by a single optical A-D converter means, and this leads to the feature that the entire apparatus is simplified.

A nonlinear Fabry-Pérot resonator (hereinafter simply referred to as the Fabry-Pérot resonator) is mentioned as a nonlinear optical element suitably used in the above-described embodiments. At this time, it is desirable that the absorption coefficient of the nonlinear medium in the Fabry-Pérot resonator, the length of the resonator, the reflectances on the incidence side and the transmission side of the resonator mirror, the initial phase deviation from the resonance condition of the resonator, etc. be set so as to optimize the light intensity characteristics of the input light-transmitted light and the input light-reflected light. This will hereinafter be described.

FIG. 34 is a schematic view of an embodiment of the Fabry-Pérot resonator. In this figure, the reference numeral 31 designates an incidence side mirror (a front mirror) having an intensity reflectance $R_F$, and the reference numeral 32 denotes a transmission side mirror (a rear mirror) having an intensity reflectance $R_B$. The reference numeral 33 designates a nonlinear medium having an absorption coefficient a and a Fabry-Pérot resonator length d, and the refractive index n thereof is represented by $n = n_n + \Delta n I_c$, where $n_o$ is the refractive index in a dark condition. Ic is the internal light intensity, and $\Delta n$ is the nonlinear refractive index coefficient conforming to the internal light intensity. The reference numeral 34 denotes the input light having a light intensity $I_o$, the reference numeral 35 designates the transmitted light usually performing the function of the first output light and having a light intensity $I_t$, and the reference numeral 36 denotes the reflected light usually performing the function of the second output light and having a light intensity $I_R$.

Assuming that the transmittance T of the Fabry-Pérot resonator is $$T = I_t/I_o,  \quad (1)$$

the transmittance T is varied by tuning the resonator. The resonance condition in which the transmittance T becomes highest is obtained when $$n \cdot d = m \cdot \frac{\lambda}{2} \quad (2)$$

where m is an integer and $\lambda$ is the wavelength used.

Also, in the Fabry-Pérot resonator, the following relation is established between the internal light intensity and the transmitted light intensity:

$$I_T = B I_c \quad (3)$$

where B is expressed as follows:

$$B = \frac{a \cdot d \cdot (1 - R_B) \cdot e^{-ad}}{(1 - e^{-ad})(1 + R_B e^{-ad})}$$

From equations (1) and (3), $$T = B \cdot \frac{I_c}{I_o}. \quad (4)$$

The resonance condition is realized with the internal light intensity $I_c$ becoming great due to the increasing effect of the input light intensity $I_o$ by resonance. The manner in which the refractive index depends on the internal light intensity $I_c$ is expressed as follows:

$$n = n_n + \Delta n I_c \quad (5)$$

The equation for expressing the manner of tuning of the Fabry-Pérot resonator by the use of this is as follows:

$$T = \frac{A}{1 + F \sin^2\left(\frac{2\pi}{\lambda} n \cdot d + \delta_o\right)}, \quad (6)$$

where $$A = \frac{(1 - R_F)(1 - R_B) e^{-ad}}{(1 - R_a)^2}$$

$$F = \frac{4 \cdot R_a}{(1 - R_a)^2}$$

$$R_a = \sqrt{R_F \cdot R_B} \, e^{-ad}$$

Figure 36:
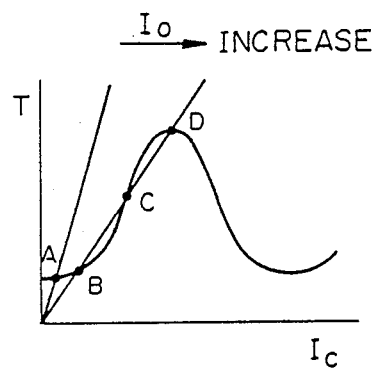
Figure 37:
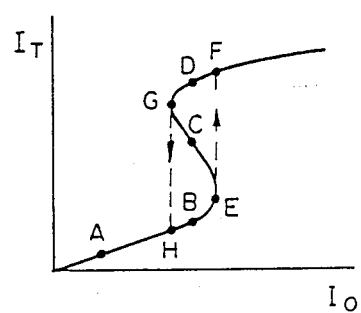

$\delta_o$ is the initial phase deviation, and its relation with the resonance condition is as shown in FIG. 35. FIG. 36 shows T and $I_c$ in equations (3) and (6). The relation between $I_o$ and $I_T$ with $I_c$ eliminated from equations (3) and (5) is shown in FIG. 37. In FIG. 37, as $I_o$ increases from 0, $I_T$ increases gradually. However, when $I_o$ reaches a point E, $I_T$ jumps and reaches a point F. Conversely, when $I_o$ is decreased, $I_T$ passes through the upper branch and decreases to a point G, at which it drops to a point H. Thus, a bistable phenomenon occurs within an appropriate range of $I_o$.

In the optical A-D converter means used in the present embodiment, the light input to the nonlinear Fabry-Pérot resonator is pulse-like, and the input light becomes 0, that is, is reset, each time it is fed back and the light is input, and therefore, the actually important input and output characteristics are a curve passing through the lower branch of FIG. 37. The threshold value $I_{th}$ is the point E. The above mechanism has been described with respect to the transmitted light, but with respect also to the reflection side, it is possible to obtain such mechanism in a similar manner.

It is to be noted that in this case, the following two equations are solved:

$$I_R = I_o - C \cdot I_c \tag{7}$$

$$I_C = \frac{D \cdot I_o}{1 + F\sin^2\left(\frac{2\pi}{\lambda} n \cdot d + \delta_o\right)} \tag{8}$$

where $$C = \frac{\alpha \cdot d(1 - R_B e^{-\alpha d})}{(1 + R_B e^{-\alpha d})(1 - e^{-\alpha d})}$$

$$D = \frac{(1 - R_F)(1 + R_B e^{-\alpha d})(1 - e^{-\alpha d})}{\alpha d (1 - R_\alpha)^2}$$

Figure 38:
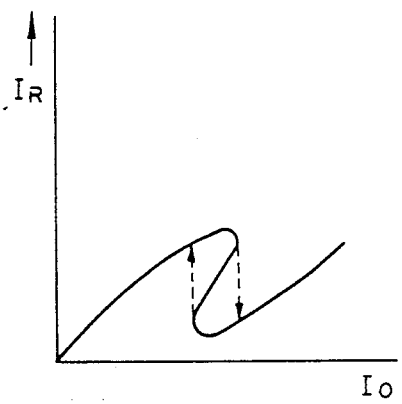

FIG. 38 is a schematic graph of the input and output characteristics showing the bistability obtained at this time. The input and output characteristic actually concerned with the optical A-D converter is a curve passing through the upper branch of FIG. 38.

As previously described, to realize a highly accurate optical A D converter, it is desirable that the nonlinear Fabry-Pérot resonator have input and output characteristics approximate to that shown in FIGS. 2 and 3. That is, with regard to the input and output characteristics on the transmission side, it is desirable that it be stepwise, and with regard to the input and output characteristics on the transmission side, it is desirable that it have a steep variation at the threshold value and be like a linear sawtooth wave in the other portions.

In the present embodiment, each element is set as previously described in order to provide a highly accurate optical A-D converter. That is, when the relation between the input light intensity $I_o$ and the transmitted light intensity $I_t$ is expressed mathematically, there is obtained the following transcendental equation from equations (3), (4), (5) and (6):

$$I_t\{1 + F\sin^2\{2\pi d \cdot \Delta n \cdot I_t/(B \cdot \lambda) + \delta\}\} - B \cdot D \cdot I_o = 0, \tag{9}$$

where $\delta = 2\pi d \cdot n_o/\lambda + \delta_o$.

Likewise, the relation between the input light intensity $I_o$ and the reflected light intensity $I_R$ is obtained from equations (7), (8) and (5) by the following transcendental equation:

$$(I_o - I_R) \cdot [1 + F\sin^2\{2\pi d \cdot \Delta n \cdot (I_o - I_R)/(C \cdot \lambda) + \delta\}] - C \cdot D \cdot I = 0 \tag{10}$$

Figure 39:
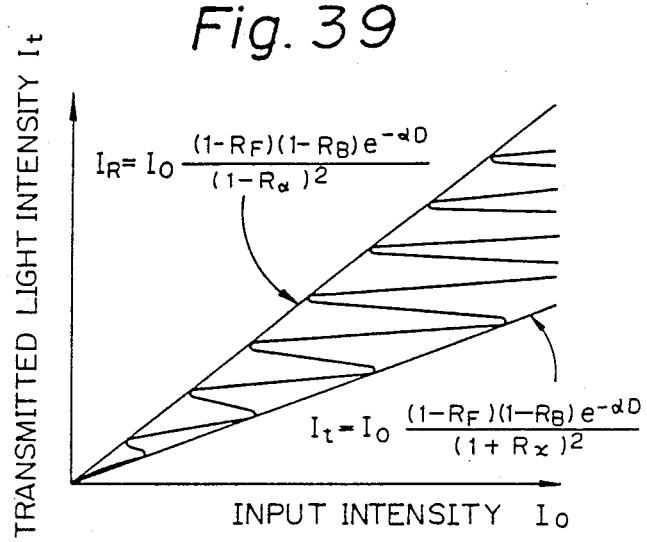
Figure 40:
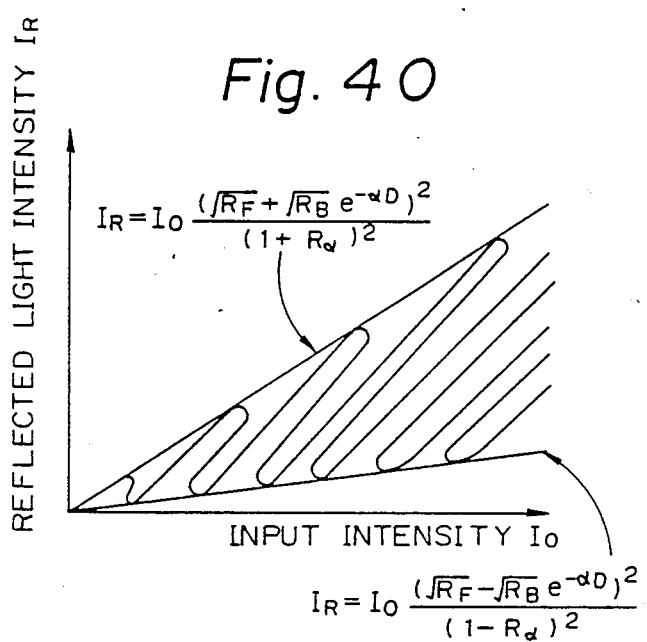

By solving the transcendental equations (9) and (10), the input and output relation as shown, for example, in FIGS. 39 and 40 is obtained. From the above equation and these figures, the input and output relation is put between the following envelopes:

On the transmission side, $$I_t = B \cdot D \cdot I_o \tag{11}$$

$$I_t = B \cdot D \cdot I_o / (1 + Fl) \tag{12}$$

Rewriting these.

$$I_t = I_o(1-F)(1-B)e^{-\alpha d}/(1-R_\alpha)^2 \tag{11}'$$

$$I_t = I_o(1-F)(1-B)e^{-\alpha d}/(1+R_\alpha)^2 \tag{12}'$$

On the reflection side, $$I_R = \{1 - C \cdot D/(1+F)\} \cdot I_o \tag{13}$$

$$I_R = (1 - C \cdot D) \cdot I_o \tag{14}$$

Rewriting these, $$I_R = I_o(\sqrt{R_F} + \sqrt{R_B} \cdot e^{-\alpha d})^2/(1+R_\alpha)^2 \tag{13}'$$

$$I_R = I_o(\sqrt{R_F} - \sqrt{R_B} \cdot e^{-\alpha d})^2/(1-R_\alpha)^2 \tag{14}'$$

The most important point in the input and output characteristics of the nonlinear Fabry-Pérot resonator to make the optical A-D converter highly accurate is that the reflected light intensity sharply drops at the position whereat the input light intensity exceeds the threshold value.

That is, setting the difference in the output value in the vicinity of the input threshold value, i.e., the ON-OFF ratio, to a greatest possible value leads to the optimization of the nonlinear Fabry-Pérot resonator. The most effective method therefor is to approximate the inclination of the envelope of FIGS. 39 and 40 to 0.

On the transmission side, from equation (12)', $$(1-R_F)(1-R_B) \rightarrow 0. \tag{15}$$

likewise, on the reflection side, from equation (14)', $$R_F/R_B \rightarrow e^{-2\alpha d}. \tag{16}$$

A specific embodiment will now be described.

Figure 41:
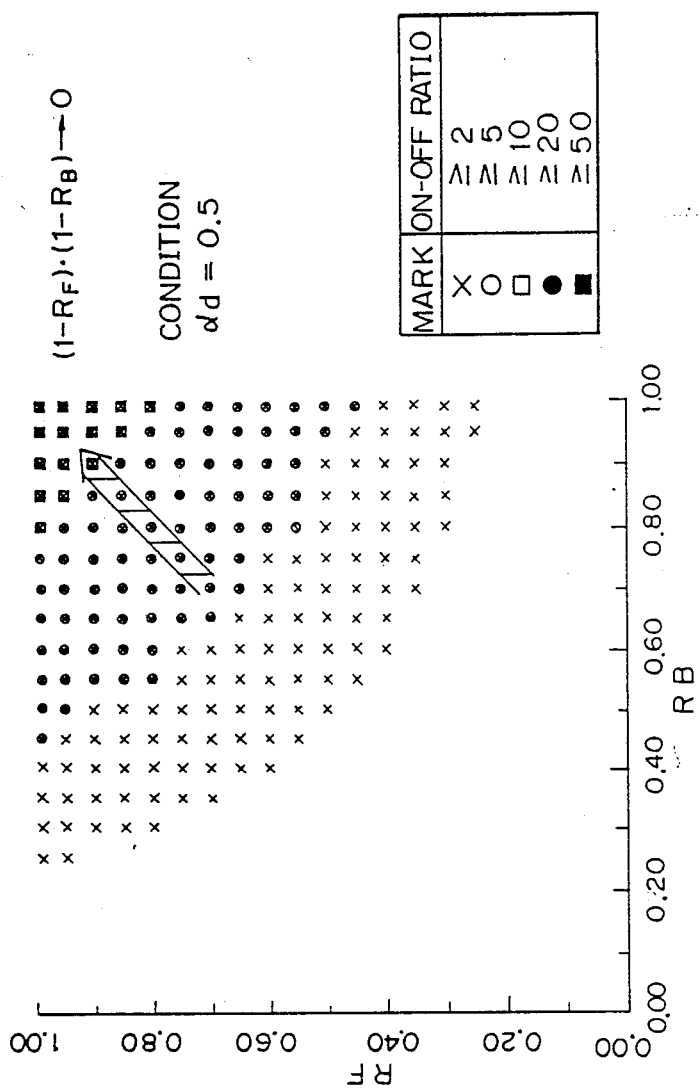
Figure 42:
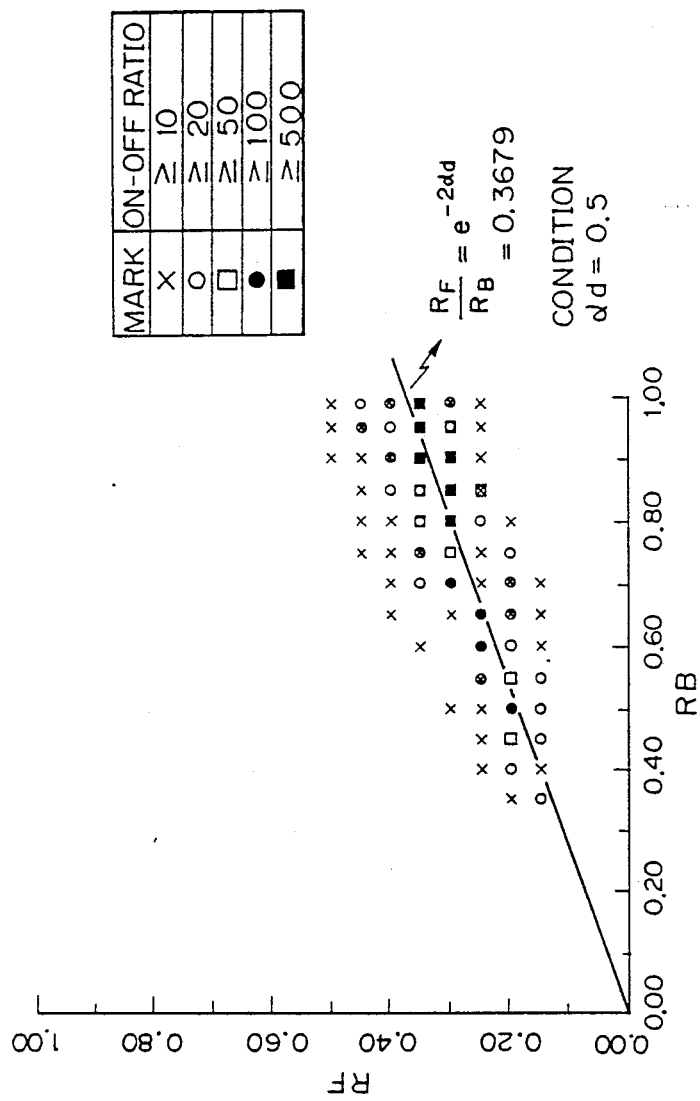

Graphs in which the amount of absorption $\alpha d$ of the nonlinear Fabry-Pérot resonator is fixed at 0.5 and the output value in the vicinity of the input threshold value is calculated and plotted as the ON/OFF ratio are shown in FIGS. 41 and 42. In these figures, the tendencies of formulas (15) and (16) are shown.

As shown in these figures, the range of optimum design differs between the transmission side and the reflection side. For the purpose of optical A-D conversion, the input and output characteristics of the reflection side becomes particularly important because generally, if at the threshold value, the output value becomes far from 0, feedback takes place by that value to cause an error.

On the other hand, the output value of the transmission side is not so severe in conditions as on the reflection side because it is grasped as a digital value and because it is not fed back.

Therefore, as the basis for designing an optical A-D converter, it is preferable to set the resonator mirror reflectance of the nonlinear Fabry-Pérot resonator as follows:

$$R_F/R_B \rightarrow e^{-2\alpha d} \tag{16a}$$

Particularly in the present embodiment, it is preferable in accomplishing highly accurate optical A-D conversion that each element in the Fabry-Pérot resonator be set as follows:

$$R_B e^{-2\alpha d} - 0.15 \leq R_F \leq R_B e^{-2\alpha d} + 0.15 \tag{17}$$

Also, as can be seen from FIG. 40, it is a requisite condition that the inclination of the lower envelope becomes approximate to 0, but at the same time, it is important to prevent the inclination of the upper envelope from becoming very small. That is, if the intensity of the reflected light is extremely low, the light utilization rate becomes low and the amplification gain of the optical amplifier must be enhanced, and this is not preferable as the system of the entire optical A-D converter. This tendency also appears in FIG. 42.

The optimum conditions exist in the vicinity of $R_F/R_B=e^{2\alpha d}$, and among them, it is apparent that the state in which $R_F$ and $R_B$ are relatively great is more desirable.

In many cases, it is desirable that at least one of $R_F$ and $R_B$ be of a reflectance 0.3, or more that is, 30% or more. Especially, the case where the value of $R_B$ is great is more desirable.

In the present embodiment, as $\alpha \cdot d$, i.e., the amount of absorption in the nonlinear medium is smaller, the value of $R_F/R_B$ in formula (16a) becomes more approximate to 1 and accordingly, the condition which satisfies the tendency shown in formula (15) comes out.

The absorption coefficient $\alpha$ and the Fabry-Pérot resonator length d which have been fixed parameters in the present embodiment for the sake of convenience are also important parameters in the design of the elements.

Figure 43:
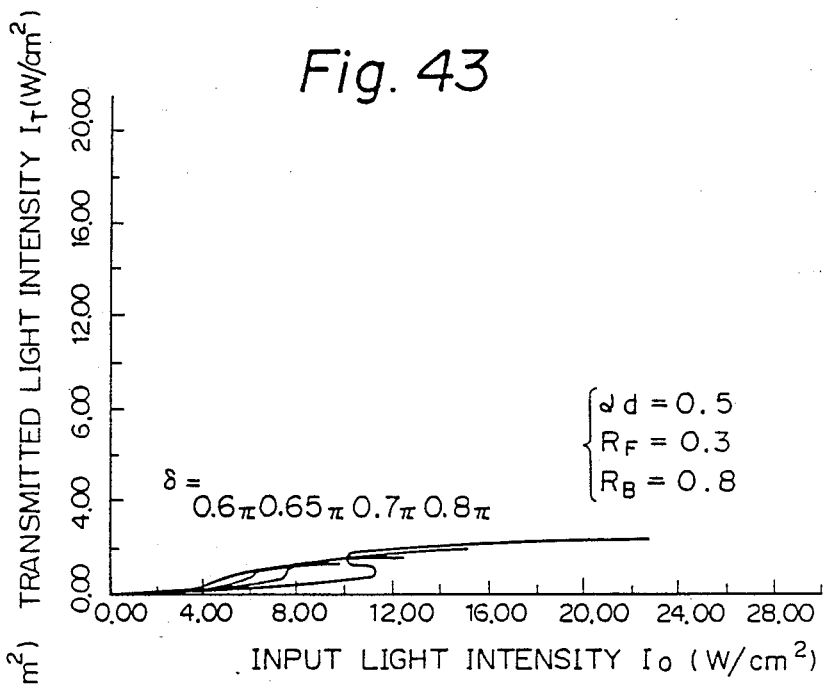
FIGS. 43 and 44 are graphs showing an example of the measurement of the input and output characteristics of the nonlinear Fabry-Pérot resonator.
Figure 44:
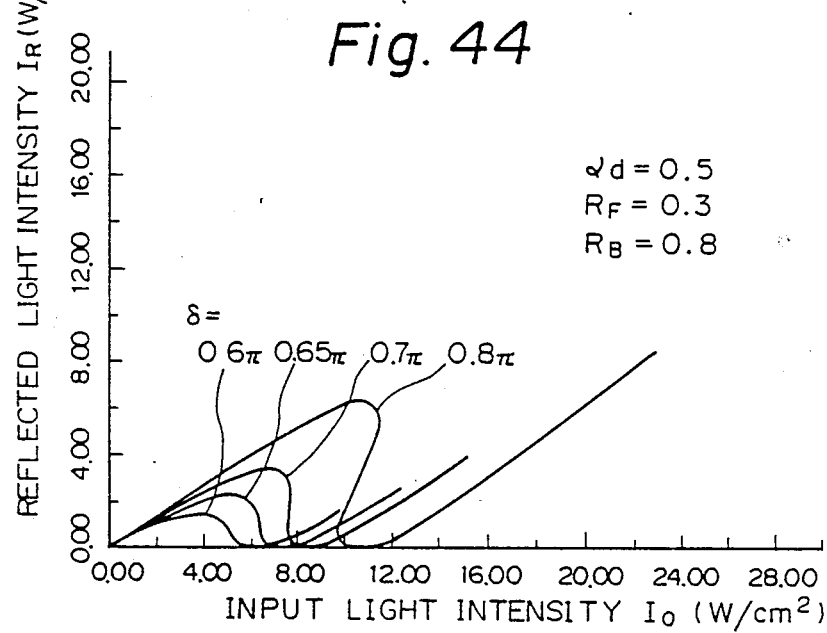

Examples of the measurement of the input and output characteristic are shown in FIGS. 43 and 44. Here, the designed value $R_F/R_B=0.3/0.8=0.375$ is approximate to $e^{-\alpha d}=0.368$ and substantially satisfies formula (16a). Thus, it is clear that the reflected light intensity drops to the vicinity of 0 at the threshold value.

In the present embodiment, as the input image, mention may be made of, for example, a hard copy such as a photographic film, a photographic print or other various prints, or a soft copy such as a CRT, a liquid crystal display device or a spatial optical modulator.

The input light to the optical A-D converter may be a transmitted light, or a reflected light, or a natural light, depending on the input image. Also, it is possible to effect wavelength conversion by the use of a spatial optical modulator or the like in accordance with the wavelength sensitivity of the nonlinear Fabry-Pérot resonator.

Figure 45:
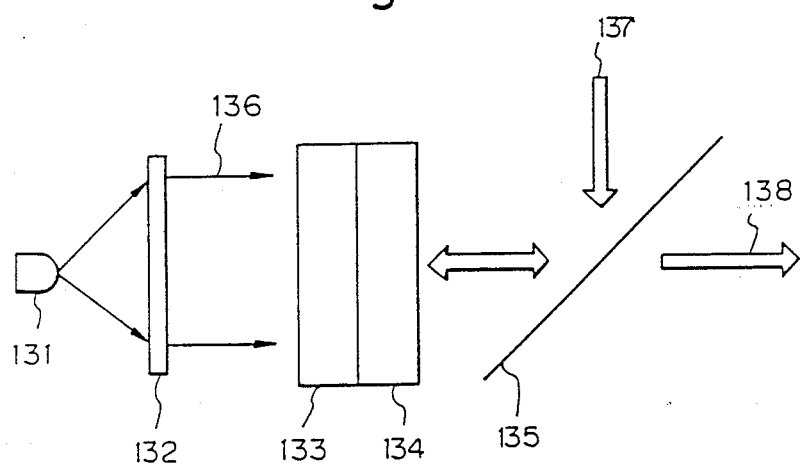
FIG. 45 is a schematic diagram showing an example of the method of inputting an image to the optical A-D converter of the present invention.

FIG. 45 is a schematic diagram showing a specific example of the input method from the input image to the optical A-D converter in the present invention.

The present embodiment use a so-called optical depiction type spatial optical modulator. The reference numerals 131 and 132 designate an illuminating light source and an input image, respectively. Also, the present embodiment uses CdS having photoconductivity as a light receiving layer 133, and uses as an optical modulating layer 134 liquid crystal causing a variation in electric field by the utilization of the fact that the electric field of CdS varies in conformity with the quantity of received light.

Besides it, a photodiode or a phototransistor using a semiconductor may be used as the light receiving layer 133. Also, as the optical modulating layer 134, besides liquid crystal, use may be made of PLZT, $LiNbO_3$, $Bi_{12}SiO_{20}$ or the like having the electro-optical effect. Further, a light-emitting diode, a semiconductor laser or the like may be used as means for outputting lights of the same wavelength.

In the present embodiment, the input image 12 is depicted into each light receiving layer 133, whereafter a light 137 having a wavelength conforming to the Fabry-Pérot resonator is caused to enter the optical modulating layer 134 through a polarizing beam splitter 135, whereby an image having the input image information comprising said wavelength is obtained through the polarizing beam splitter 135. After all, 2 $\mu$sec. has been required for processing 4 bits. However, in the present processing, the image information is parallel-handled and therefore, the substantial processing speed is very high.

Figure 46:
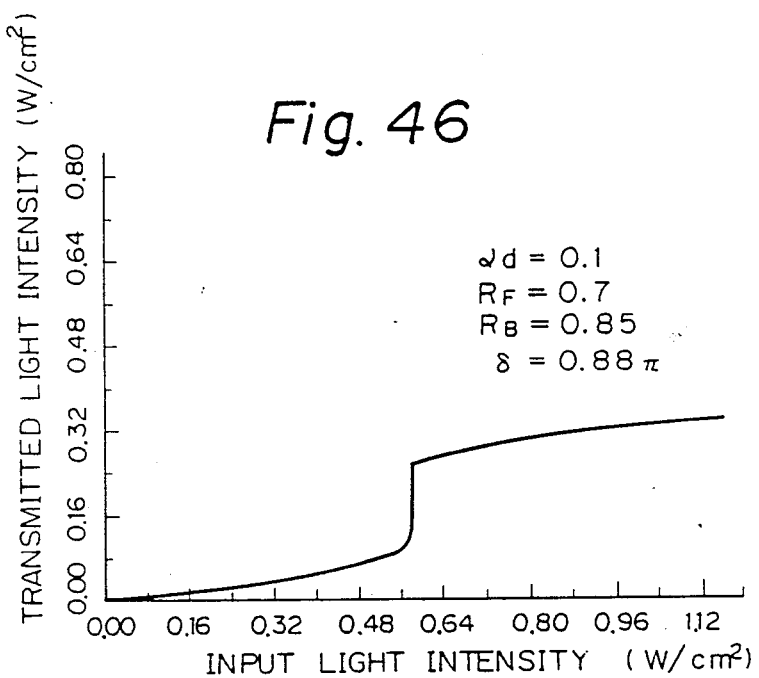
FIGS. 46-48 are graphs showing examples of the measurement of the input and output characteristics when a Fabry-Pérot, resonator is used as the nonlinear optical element shown in FIG. 13.
Figure 47:
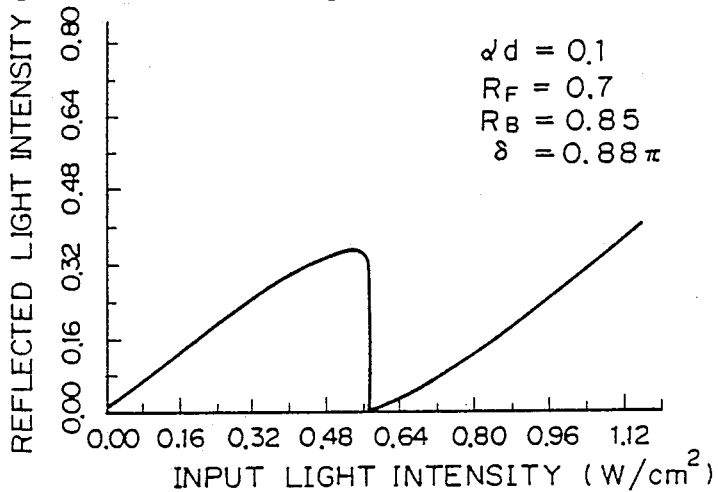

The input-transmission characteristic and the input-reflection characteristic when the above-described Fabry-Pérot resonator is used in the embodiment of FIG. 13 are shown in FIGS. 46 and 47. Also, the result of 4-bit processing in this example is shown in FIG. 48.

In the present embodiment, the product $\alpha d$ of the absorption coefficient $\alpha(\mu m^{-1})$ and the resonator length d ($\mu$m) is $\alpha d=0.1$ and accordingly, from the condition that $R_F/R_B=e^{-2\alpha d}$, the reflectances $R_F$ and $R_B$ of the resonator mirror are $R_F/R_B=0.8$, where $R_F=0.7$ and $R_B=0.85$.

According to the present embodiment, as shown in FIG. 46, a step-like input and output characteristic is obtained on the transmission side and a sawtooth-like input and output characteristic in which the output value becomes 0 at the threshold value is obtained on the reflection side.

Figure 48:
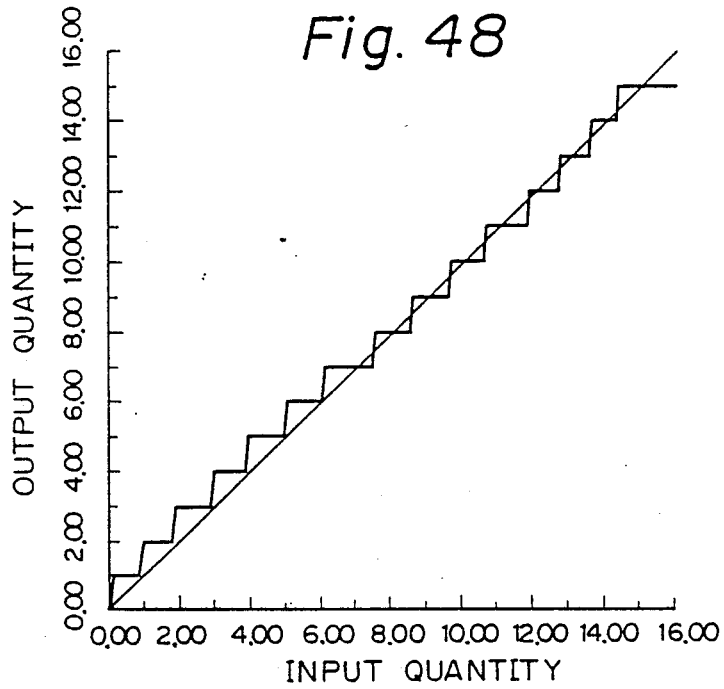

In FIG. 48, the horizontal axis represents the input analog quantity in harmony and the vertical axis represents the digital quantity. The straight line is an ideal result, whereas the stepwise line is the result of the present embodiment.

In the present embodiment, in order to ascertain the processing information. A-D conversion has been executed, whereafter for the comparison with the input quantity, the procedure of weighting each digit and returning it to the analog quantity has been carried out. With the loss in the nonlinear Fabry-Pérot resonator and the loss in the other optical paths taken into account, the amplification gain of the optical amplifier has been 3.1 times.

In the present embodiment, a Fabry-Pérot resonator having InSb as the nonlinear medium may be constructed. By a carbon dioxide laser of wavelength 10.6 $\mu$m being used as the illuminating light source 91, the laser light excites InSb and at this time, the Fabry-Pérot resonator exhibits the input and output characteristics of FIGS. 2 and 3. The response time and the relaxation time are about 1 $\mu$sec. The optical amplifier has been realized by disposing a carbon dioxide laser which does not form the resonator and exciting it to such a degree that the natural emitted light does not violate the signal level of the present system. Accordingly, the time during which the light passes through the optical amplifier 94 can be neglected in the system.

Figure 49A:
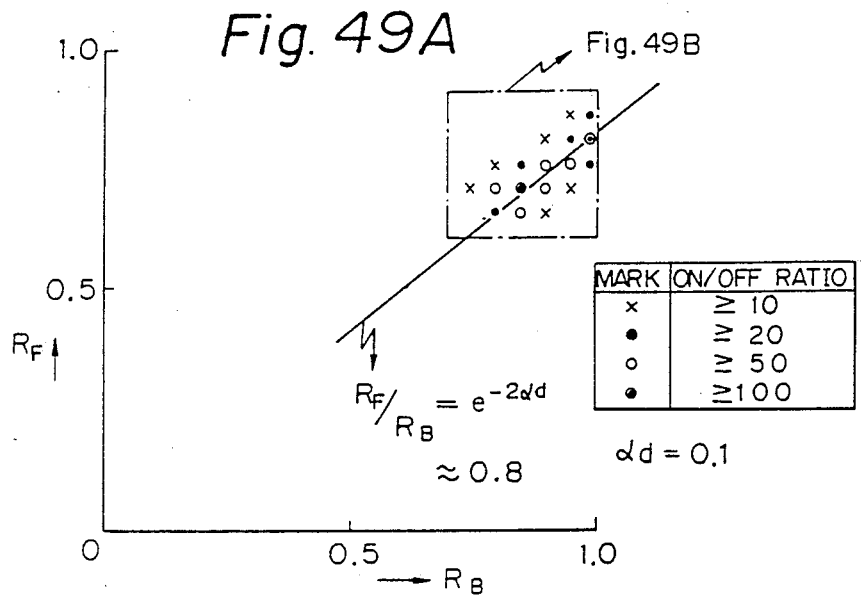
FIGS. 49A and 49B are graphs showing examples of the measurement of the ON/OFF ratio when a Fabry-Pérot resonator is used as the nonlinear optical element shown in FIG. 14.

Also, the aforedescribed Fabry-Pérot resonator has been used as the nonlinear optical element 95 to thereby construct the optical A-D converter shown in FIG. 14. In this example, the product $\alpha d$ of the absorption coefficient $\alpha$ and the resonator length d has been 0.1. FIG. 49A is a graph in which the ON/OFF ratio at the then input threshold value is represented as a weight.

This figure is one in which the reflectances $R_F$ and $R_B$ of the resonator mirror are scrutinized over the total range. The condition under which the ON/OFF ratio is high exists along $R_F/R_B=e^{-2\alpha d}\approx 0.8$, and is limited to the range in which $R_F$ and $R_B$ have values which are great to some extent.

Figure 49B:
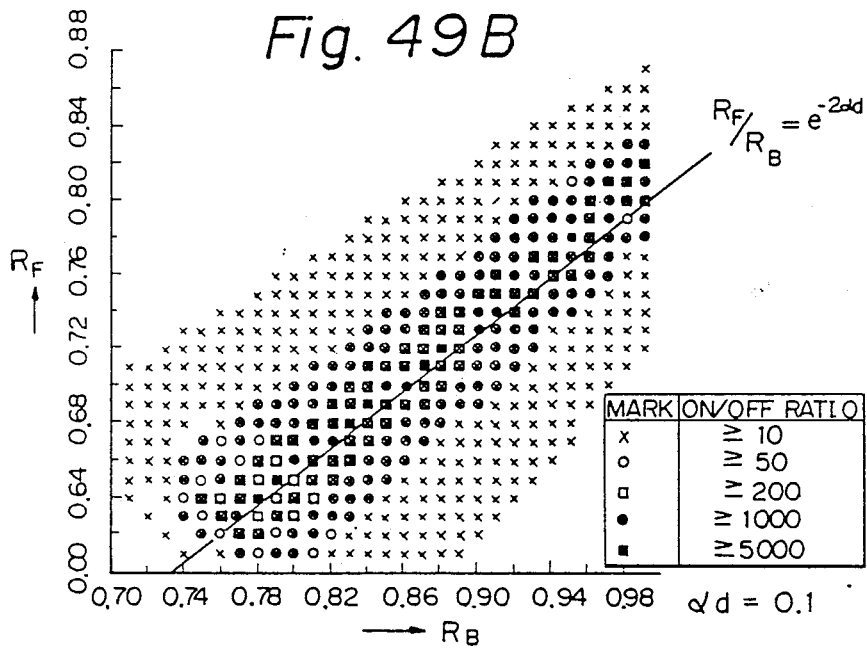

FIG. 49B is an enlarged graph of the area in which the ON/OFF ratio in FIG. 49A is high. As is apparent from this figure, the optimum condition concentrates along $R_F/R_B = e^{-2ad}$.

As described above, according to the present invention, a high-speed and highly accurate optical A-D converter can be achieved by utilizing optical A-D converter means having a predetermined nonlinear optical element. Also, two-dimensional parallel processing of information can be realized very easily and therefore, the speed-up of A-D conversion involved in the image processing becomes easy and further, A-D converting process which can be smoothly connected to other parallel processing systems becomes possible.

Also, even if the image to be processed is a polychromatic image, the image information of three primary colors is spatially or time-serially separated and extracted and parallel-processed, whereby a high-speed and highly accurate optical A-D converter can be achieved Also, by using a nonlinear Fabry-Pérot resonator as a nonlinear optical element, and appropriately setting the parameters such as the reflectance of a resonator mirror constituting the Fabry-Pérot resonator and the quantity of absorbed light in the resonator, optical A-D conversion of higher accuracy becomes possible.

The present invention is not restricted to the above-described embodiments, but various applications thereof are possible. The present invention covers all such applications without departing from the scope thereof as defined in the appended claims.

I claim:

1. An optical analog-digital converter comprising:
   a nonlinear optical element having a threshold value for the intensity of an input light and producing a first and a second output light from said input light with said threshold value as a reference, said element producing a first output light of intensity corresponding to a digital signal meaning the digit 0 and a second output light of intensity proportional to the input light intensity when the intensity of said input light is smaller than said threshold value, and producing a first output light of intensity corresponding to a digital signal meaning the digit 1 and a second output light of intensity equal to the input light intensity minus the threshold value when the intensity of said input light is greater than said threshold value;
   means for inputting to said nonlinear optical element a light having an intensity distribution corresponding to an analog signal;
   an optical feedback system for causing the second output light of said nonlinear optical element produced from said input light to be again input to said nonlinear optical element; and
   means provided in said feedback system for amplifying said second output light.

2. An optical analog-digital converter according to claim 1, further comprising an optical delay device provided in said feedback system.

3. An optical analog-digital converter according to claim 2, wherein said optical delay device comprises two optical storage devices series-connected in said feedback system, and a clock device for supplying to said optical storage devices a clock signal indicative of the timing of the input and output of a light.

4. An optical analog-digital converter according to claim 2, wherein said optical delay device comprises an optical fiber from one end of which said second output light enters and from the other end of which such light emerges toward said nonlinear optical element.

5. An optical analog-digital converter according to claim 1, wherein said amplifying means amplifies said second output light twice.

6. An optical analog-digital converter according to claim 1, wherein said amplifying means comprises an amplifying laser.

7. An optical analog-digital converter according to claim 1, wherein said nonlinear optical element comprises a nonlinear Fabry-Pérot resonator.

8. An optical analog-digital converter according to claim 7, wherein said resonator satisfies the following condition:

$$R_B e^{-2ad} - 0.15 \leq R_F \leq R_B e^{-2ad} + 0.15,$$

where $R_F$ is the intensity reflectance of the incidence side resonating surface, $R_B$ is the intensity reflectance of the transmission side resonating surface, $a$ is the absorption rate of the nonlinear medium in the resonator, and $d$ is the resonator length.

9. An optical analog-digital converter according to claim 1, wherein said analog signal is indicative of two-dimensional image information.

10. An optical analog-digital converter according to claim 9, wherein said input means comprises an input image and a light source for illuminating said image.

11. An optical analog-digital converter comprising:
   a nonlinear optical element having a threshold value for the intensity of an input light and producing a first and a second output light from said input light with said threshold value as a reference, said element producing a first output light of intensity corresponding to a digital signal meaning the digit 0 and a second output light of intensity proportional to the input light intensity when the intensity of said input light is smaller than said threshold value, and producing a first output light of intensity corresponding to a digital signal meaning the digit 1 and a second output light of intensity equal to the input light intensity minus the threshold value when the intensity of said input light is greater than said threshold value;
   means for inputting to said nonlinear optical element a light having an intensity distribution corresponding to an analog signal;
   an optical feedback system for causing the second output light of said nonlinear optical element produced from said input light to be again input to said nonlinear optical element; and
   means for controlling the threshold value of said nonlinear optical element.

12. An optical analog-digital converter according to claim 11, further comprising an optical delay device provided in said feedback system.

13. An optical analog-digital converter according to claim 12, wherein said optical delay device comprises two optical storage devices series-connected in said feedback system, and a clock device for supplying to said optical storage devices a clock signal indicative of the timing of the input and output of a light.

14. An optical analog-digital converter according to claim 12, wherein said optical delay device comprises an optical fiber from one end of which said second output light enters and from the other end of which such light emerges toward said nonlinear optical element.

15. An optical analog-digital converter according to claim 11, wherein said control means comprises a light source for inputting a bias light to said nonlinear optical element.

16. An optical analog-digital converter according to claim 11, wherein said control means reduces the threshold value of said nonlinear optical element to ½ of that during the input each time said second output light is fed back.

17. An optical analog-digital converter according to claim 11, wherein said nonlinear optical element comprises a nonlinear Fabry-Pérot resonator.

18. An optical analog-digital converter according to claim 17, wherein said resonator satisfies the following condition:

$$R_B e^{-2ad} - 0.15 \leq R_F \leq R_B e^{-2ad} + 0.15,$$

where $R_F$ is the intensity reflectance of the incidence side resonating surface, $R_B$ is the intensity reflectance of the transmission side resonating surface, $\alpha$ is the absorption rate of the nonlinear medium in the resonator, and d is the resonator length.

19. An optical analog-digital converter according to claim 11, wherein said analog signal is indicative of two-dimensional image information.

20. An optical analog-digital converter according to claim 19, wherein said input means comprises an input image and a light source for illuminating said image.

21. An optical analog-digital converter comprising:
a nonlinear optical element having a threshold value for the intensity of an input light and producing a first and a second output light from said input light with said threshold value as a reference, said element producing a first output light of intensity corresponding to a digital signal meaning the digit 0 and a second output light of intensity proportional to the input light intensity when the intensity of said input light is smaller than said threshold value, and producing a first output light of intensity corresponding to a digital signal meaning the digit 1 and a second output light of intensity equal to the input light intensity minus the threshold value when the intensity of said input light is greater than said threshold value;
means for inputting to said nonlinear optical element a light having an intensity distribution corresponding to an analog signal;
means for outputting the first output light of said nonlinear optical element produced from said input light; and
means for controlling the threshold value of said nonlinear optical element.

22. An optical analog-digital converter according to claim 21, wherein said control means comprises a light source for inputting a bias light to said nonlinear optical element.

23. An optical analog digital converter according to claim 21, wherein said nonlinear optical element comprises a nonlinear Fabry-Pérot resonator.

24. An optical analog-digital converter according to claim 23, wherein said resonator satisfies the following condition:

$$R_B e^{-2ad} - 0.15 \leq R_F \leq R_B e^{-2ad} + 0.15,$$

where $R_F$ is the intensity reflectance of the incidence side resonating surface, $R_B$ is the intensity reflectance of the transmission side resonating surface, $\alpha$ is the absorption rate of the nonlinear medium in the resonator, and d is the resonator length.

25. An optical analog-digital converter according to claim 21, wherein said analog signal is indicative of two dimensional image information.

26. An optical analog-digital converter according to claim 25, wherein said input means comprises an input image and a light source for illuminating said image.

27. An optical analog-digital converter for converting an analog signal into a digital signal of plural bits, comprising:
a plurality of nonlinear optical elements successively provided correspondingly to said bits, each of said elements having a threshold value for the intensity of an input light and producing a first output light of intensity corresponding to a digital signal meaning the digit 0 and a second output light of intensity proportional to the input light intensity when the intensity of the input light is smaller than said threshold value, and producing a first output light of intensity corresponding to a digital signal meaning the digit 1 and a second output light of intensity equal to the input light intensity minus the threshold value when the intensity of the input light is greater than said threshold value;
means for inputting to the nonlinear optical element corresponding to the first bit a light having an intensity distribution corresponding to an analog signal;
means for inputting the second output light of the nonlinear optical element corresponding to the preceding bit to the nonlinear optical element corresponding to the next bit; and
means for outputting a plurality of first output lights produced by said nonlinear optical elements.

28. An optical analog-digital converter according to claim 27, further comprising means for controlling the threshold value of each of said nonlinear optical elements.

29. An optical analog-digital converter according to claim 28, wherein said control means comprises a light source for inputting a bias light to each of said nonlinear optical elements.

30. An optical analog digital converter according to claim 27, further comprising optical amplifier means provided in the optical path between said nonlinear optical elements.

31. An optical analog-digital converter according to claim 30, wherein said amplifier means amplifies said second output light twice.

32. An optical analog-digital converter according to claim 30, wherein said amplifier means comprises an amplifying laser.

33. An optical analog-digital converter according to claim 27, wherein the threshold value of each of said nonlinear optical element is set to ½ of the threshold value of the nonlinear optical element corresponding to the bit preceding the bit indicated by that element.

34. An optical analog-digital converter according to claim 27, wherein each of said nonlinear optical elements comprises a nonlinear Fabry-Pérot resonator.

35. An optical analog-digital converter according to claim 34, wherein said resonator satisfies the following condition:

$$R_B e^{-2\alpha d} - 0.15 \leq R_F \leq R_B e^{-2\alpha d} + 0.15,$$

where $R_F$ is the intensity reflectance of the incidence side resonating surface, $R_B$ is the intensity reflectance of the transmission side resonating surface, $\alpha$ is the absorption rate of the nonlinear medium in the resonator, and d is the resonator length.

36. An optical analog-digital converter according to claim 27, wherein said analog signal is indicative of two-dimensional image information.

37. An optical analog-digital converter according to claim 36, wherein said input means comprises an input image and a light source for illuminating said image.

38. An optical analog-digital converter comprising:
 a nonlinear Fabry-Pérot resonator satisfying the following condition:

$$R_B e^{-2\alpha d} - 0.15 \leq R_F \leq R_B e^{-2\alpha d} + 0.15,$$

where $R_F$ is the intensity reflectance of the incidence side resonating surface, $R_B$ is the intensity reflectance of the transmission side resonating surface, $\alpha$ is the absorption rate of the nonlinear medium in the resonator, and d is the resonator length;
 means for inputting to said resonator a light having an intensity distribution corresponding to an analog signal; and
 means for outputting the transmitted light of said resonator.

39. An optical analog-digital converter according to claim 38, wherein said analog signal is indicative of two-dimensional image information.

40. An optical analog-digital converter according to claim 39, wherein said input means comprises an input image and a light source for illuminating said image.

41. An optical analog digital converter for a polychromatic light indicating different signals depending on the wavelength, comprising:
 means for dividing said polychromatic light into a plurality of lights of different wavelengths;
 a plurality of nonlinear optical elements to which said plurality of lights are input, each of said elements having a threshold value for the intensity of an input light and producing a first output light of intensity corresponding to a digital signal meaning the digit 0 and a second output light of intensity proportional to the input light intensity when the intensity of said input light is smaller than said threshold value, and producing a first output light of intensity corresponding to a digital signal meaning the digit 1 and a second output light of intensity equal to the input light intensity minus the threshold value when the intensity of said input light is greater than said threshold value; and
 means for outputting the plurality of first output lights produced by said nonlinear optical elements.

42. An optical analog-digital converter according to claim 41, wherein said dividing means comprises a color resolving prism.

43. An optical analog-digital converter according to claim 41, further comprising an optical feedback system for causing the second output lights of said nonlinear optical elements to be again input to said nonlinear optical elements.

44. An optical analog-digital converter according to claim 43, further comprising an optical delay device provided in said feedback system.

45. An optical analog-digital converter according to claim 44, wherein said optical device comprises two optical storage devices series-connected in said feedback system, and a clock device for supplying to said optical storage devices a clock signal indicative of the timing of the input and output of a light.

46. An optical analog-digital converter according to claim 44, wherein said optical delay device comprises an optical fiber from one end of which said second output light enters and from the other end of which said light emerges toward said nonlinear optical elements.

47. An optical analog-digital converter according to claim 42, further comprising means for controlling the threshold value of each of said nonlinear optical elements.

48. An optical analog-digital converter according to claim 47, wherein said control means comprises a light source for inputting a bias light to said nonlinear optical elements.

49. An optical analog-digital converter according to claim 47, wherein said control means reduces the threshold value of each of said nonlinear optical elements to ½ of that during the input each time said second output lights are fed back.

50. An optical analog-digital converter according to claim 41, wherein each of said nonlinear optical elements comprises a nonlinear Fabry-Pérot resonator.

51. An optical analog-digital converter according to claim 50, wherein said resonator satisfies the following condition:

$$R_B e^{-2\alpha d} - 0.15 \leq R_F \leq R_B e^{-2\alpha d} + 0.15,$$

where $R_F$ is the intensity reflectance of the incidence side resonating surface, $R_B$ is the intensity reflectance of the transmission side resonating surface, $\alpha$ is the absorption rate of the nonlinear medium in the resonator, and d is the resonator length.

52. An optical analog-digital converter according to claim 41, wherein said polychromatic light is indicative of two-dimensional color image information.

53. An optical analog-digital converter according to claim 52, wherein said input means comprises an input color image and a white light source for illuminating said image.

54. An optical analog-digital converter for effecting analog-digital conversion of a color image, comprising:
 means for time-serially separating and extracting from said color image lights indicative of image information of different colors;
 a nonlinear optical element to which said extracted lights are time-serially input; said element having a threshold value for the intensity of an input light and producing a first output light of intensity corresponding to a digital signal meaning the digit 0 and a second output light of intensity proportional to the input light intensity when the intensity of the input light is smaller than said threshold value, and producing a first output light of intensity corresponding to a digital signal meaning the digit 1 and a second output light of intensity equal to the input light intensity minus the threshold value when the intensity of the input light is greater than said threshold value; and
 means for time-serially outputting first output lights corresponding to the different color signals produced by said nonlinear optical elements.

55. An optical analog-digital converter according to claim 54, wherein said extracting means comprises a plurality of light sources for illuminating said color image with lights of different wavelengths and turned on time-serially.

56. An optical analog-digital converter according to claim 54, further comprising an optical feedback system for causing the second output light of said nonlinear optical element to be again input to said nonlinear optical element.

57. An optical analog-digital converter according to claim 56, further comprising an optical delay device provided in said feedback system.

58. An optical analog-digital converter according to claim 57, wherein said optical delay device comprises two optical storage devices series-connected in said feedback system, and a clock device for supplying to said optical storage devices a clock signal indicative of the timing of the input and output of a light.

59. An optical analog-digital converter according to claim 57, wherein said optical delay device comprises an optical fiber from one end of which said second output light enters and from the other end of which said light emerges toward said nonlinear optical element.

60. An optical analog-digital converter according to claim 54, further comprising means for controlling the threshold value of said nonlinear optical element.

61. An optical analog-digital converter according to claim 60, wherein said control means comprises a light source for inputting a bias light to said nonlinear optical element.

62. An optical analog-digital converter according to claim 60, wherein said control means reduces the threshold value of said nonlinear optical element to $\frac{1}{2}$ of that during the input each time said second output light is fed back.

63. An optical analog-digital converter according to claim 54, wherein said nonlinear optical element comprises a nonlinear Fabry-Pérot resonator.

64. An optical analog-digital converter according to claim 63, wherein said resonator satisfies the following condition:

$$R_B e^{-2\alpha d} - 0.15 \leq R_F \leq R_B e^{-2\alpha d} + 0.15,$$

where $R_F$ is the intensity reflectance of the incidence side resonating surface, $R_B$ is the intensity reflectance of the transmission side resonating surface, $\alpha$ is the absorption rate of the nonlinear medium in the resonator, and d is the resonator length.

* * * * *

UNITED STATES PATENT AND TRADEMARK OFFICE
CERTIFICATE OF CORRECTION

PATENT NO. : 4,926,177

DATED : May 15, 1990

INVENTOR(S) : Hajime Sakata

It is certified that error appears in the above-identified patent and that said Letters Patent is hereby corrected as shown below:

[57] ABSTRACT:

Line 7, "digital 0" should read --digit 0--.

Line 21, "amplifiers" should read --amplifies--.

COLUMN 3:

Line 32, "Figures 31-31" should read --Figures 31-33--.

COLUMN 7:

Line 43, "confirmity" should read --conformity--.

COLUMN 10:

Line 38, "or" should read --of--.

COLUMN 11:

Line 58, "whole" should read --whose--.

COLUMN 13:

Line 33, "dentoes" should read --denotes--.

UNITED STATES PATENT AND TRADEMARK OFFICE
CERTIFICATE OF CORRECTION

PATENT NO. : 4,926,177
DATED : May 15, 1990
INVENTOR(S) : Hajime Sakata

It is certified that error appears in the above-identified patent and that said Letters Patent is hereby corrected as shown below:

Line 45, "elemetns 17B" should read --elements 17B--.

COLUMN 15:

Line 50, "$n_n + \triangle nIc$" should read --$n = n_0 + \triangle nIc$--.

COLUMN 16:

Line 28, "$n = n_n + \triangle nIc$" should read --$n = n_0 + \triangle nIc$--.

COLUMN 17:

Line 52, "$\sin^2\{2\pi d \cdot \triangle n_2 (I_0-I_R)/(C \cdot \lambda) + \delta\}]-C \cdot D \cdot I_0 = 0$"
should read --$\sin^2\{2\pi d \cdot \triangle n \cdot (I_0-I_R)/(C \cdot \lambda) + \delta\}]-C \cdot D \cdot I_0 = 0$--.

Line 63, "$I_t = B \cdot D \cdot I_0/(1+F1)$" should read --$I_t = B \cdot D \cdot I_0/(1+F)$--.

Line 64, "these." should read --these,--.

Line 66, "$I_t = I_0(1-_F)(1-_B)e^{-\alpha d}/(1-R\alpha)^2$" (11)'"
should read --$I_t = I_0(1-R_F)(1-R_B)e^{-\alpha d}/(1-R\alpha)^2$" (11)'--.

Line 67, "$I_t = I_0(1-_F)(1-_B)e^{-\alpha d}/(1+R\alpha)^2$" (12)'"
should read --$I_t = I_0(1-R_F)(1-R_B)e^{-\alpha d}/(1+R\alpha)^2$" (12)'--.

UNITED STATES PATENT AND TRADEMARK OFFICE
CERTIFICATE OF CORRECTION

PATENT NO. : 4,926,177

DATED : May 15, 1990

INVENTOR(S) : Hajime Sakata

It is certified that error appears in the above-identified patent and that said Letters Patent is hereby corrected as shown below:

COLUMN 19:

Line 9, "$R_F/R_B = e^{2\alpha d}$," should read --$R_F/R_B = e^{-2\alpha d}$,--.

Signed and Sealed this

Twentieth Day of April, 1993

Attest:

MICHAEL K. KIRK

*Attesting Officer*    *Acting Commissioner of Patents and Trademarks*